US012725446B2

(12) United States Patent
Yang et al.

(10) Patent No.: US 12,725,446 B2
(45) Date of Patent: Sep. 1, 2026

(54) CONTROL METHOD, CONTROL APPARATUS, ELECTRONIC DEVICE, STORAGE MEDIUM, AND COMPUTER PROGRAM PRODUCT

(71) Applicant: SHENZHEN GOODIX TECHNOLOGY CO., LTD., Shenzhen (CN)

(72) Inventors: Yuchang Yang, Shenzhen (CN); Yuping Liu, Shenzhen (CN); Bo Wang, Shenzhen (CN); Zhiqiang Zhong, Shenzhen (CN)

(73) Assignee: SHENZHEN GOODIX TECHNOLOGY CO., LTD. (CN)

( * ) Notice: Subject to any disclaimer, the term of this patent is extended or adjusted under 35 U.S.C. 154(b) by 0 days.

(21) Appl. No.: 19/001,809

(22) Filed: Dec. 26, 2024

(65) Prior Publication Data

US 2026/0004606 A1 Jan. 1, 2026

Related U.S. Application Data

(63) Continuation of application No. PCT/CN2024/102113, filed on Jun. 27, 2024.

(51) Int. Cl.
*G06V 40/13* (2022.01)
*G06F 3/041* (2006.01)

(52) U.S. Cl.
CPC ...... *G06V 40/1306* (2022.01); *G06F 3/04186* (2019.05)

(58) Field of Classification Search
None
See application file for complete search history.

(56) References Cited

U.S. PATENT DOCUMENTS

2012/0182257 A1* 7/2012 Yamamoto ............ G06F 3/0446 345/174
2017/0255338 A1* 9/2017 Medina ................. G06F 3/0416
2021/0067623 A1* 3/2021 D'Souza ................. G06F 21/32
2023/0401886 A1 12/2023 Dhindhsa et al.
(Continued)

FOREIGN PATENT DOCUMENTS

CN 106155437 A 11/2016
CN 107113349 A 8/2017
CN 107527020 A 12/2017
(Continued)

OTHER PUBLICATIONS

International search report of PCT/CN2024/102113 issued by CNIPA on Dec. 25, 2024.

*Primary Examiner* — Joseph R Haley
(74) *Attorney, Agent, or Firm* — Emerson, Thomson & Bennett, LLC; Roger D. Emerson; Peter R. Detorre

(57) ABSTRACT

Embodiments of the present disclosure provide a control method, a control apparatus, an electronic device, a storage medium, and a computer program product. The control method is used for an ultrasonic fingerprint sensor of a terminal device. The control method includes: determining whether the terminal device has entered an underwater operating mode; and determining, in response to the terminal device having entered the underwater operating mode, a target operating mode of the ultrasonic fingerprint sensor, and controlling the ultrasonic fingerprint sensor to enter the target operating mode for operation.

17 Claims, 6 Drawing Sheets

(56) References Cited

U.S. PATENT DOCUMENTS

| | | | | |
|---|---|---|---|---|
| 2024/0399235 | A1* | 12/2024 | Jiang | G06F 3/0482 |
| 2025/0123717 | A1* | 4/2025 | Xu | G02B 13/18 |

FOREIGN PATENT DOCUMENTS

| | | | |
|---|---|---|---|
| CN | 107563262 | A | 1/2018 |
| CN | 108255397 | A | 7/2018 |
| CN | 108491793 | A | 9/2018 |
| CN | 108595098 | A | 9/2018 |
| CN | 109085941 | A | 12/2018 |
| CN | 109085957 | A | 12/2018 |
| CN | 109791582 | A | 5/2019 |
| CN | 110287919 | A | 9/2019 |
| CN | 110287931 | A | 9/2019 |
| CN | 110309776 | A | 10/2019 |
| CN | 110472399 | A | 11/2019 |
| CN | 112070017 | A | 12/2020 |
| CN | 115953811 | A | 4/2023 |
| CN | 116107449 | A | 5/2023 |
| CN | 116311394 | A | 6/2023 |
| CN | 117119276 | A | 11/2023 |
| CN | 117369663 | A | 1/2024 |
| KR | 20130030970 | A | 3/2013 |
| WO | WO2023274073 | A1 | 1/2023 |

* cited by examiner

CONTROL METHOD, CONTROL APPARATUS, ELECTRONIC DEVICE, STORAGE MEDIUM, AND COMPUTER PROGRAM PRODUCT

CROSS REFERENCE TO RELATED APPLICATIONS

The present application is a continuation of international application No. PCT/CN2024/102113, filed on Jun. 27, 2024, which is hereby incorporated by reference in its entirety.

TECHNICAL FIELD

Embodiments of the present disclosure relate to the technical field of fingerprint sensors, and particularly relate to a control method, a control apparatus, an electronic device, a storage medium, and a computer program product.

BACKGROUND

At the present stage, waterproof performance of a terminal device, such as a mobile phone, is constantly improved, and in some scenarios, a user also has requirements for underwater use of a terminal device, such as a mobile phone. For example, if the user accidentally brings his mobile phone into water while swimming, he still hopes that malfunction of his mobile phone will not be caused by water immersion, and even hopes that his mobile phone can be used normally in water. Some terminal devices achieve functions, such as unlocking and transactions, relying on fingerprint sensors. However, at present, most technical solutions of fingerprinting cannot well satisfy requirements for underwater operating, thereby resulting in poor underwater use effects of the terminal devices. Therefore, a new technical solution is needed to improve this problem.

SUMMARY

In view of this, an embodiment of the present disclosure provides a control solution.

According to an embodiment in a first aspect of the present disclosure, a control method for an ultrasonic fingerprint sensor of a terminal device is provided. The method includes: determining whether the terminal device has entered an underwater operating mode; and determining, in response to the terminal device having entered the underwater operating mode, a target operating mode of the ultrasonic fingerprint sensor, and controlling the ultrasonic fingerprint sensor to enter the target operating mode for operation.

According to an embodiment in a second aspect of the present disclosure, a control method is provided, including: a control unit for a terminal device. The method includes: determining whether the terminal device has entered an underwater operating mode, and generating an indication signal in response to determining that the terminal device has entered the underwater operating mode; and transmitting the indication signal to an ultrasonic fingerprint sensor, so that the ultrasonic fingerprint sensor determines a target operating mode of the ultrasonic fingerprint sensor in response to the indication signal, and enters the target operating mode for operation.

According to an embodiment in a third aspect of the present disclosure, a control apparatus for an ultrasonic fingerprint sensor of a terminal device is provided. The control apparatus includes: a first determination module configured to determine whether the terminal device has entered an underwater operating mode; and a first control module configured to determine, in response to the terminal device having entered the underwater operating mode, a target operating mode of the ultrasonic fingerprint sensor, and control the ultrasonic fingerprint sensor to enter the target operating mode for operation.

According to an embodiment in a fourth aspect of the present disclosure, a control apparatus is provided, including: a control unit for a terminal device. The control apparatus includes: a second determination module configured to determine whether the terminal device has entered an underwater operating mode, and generate an indication signal in response to determining that the terminal device has entered the underwater operating mode; and a second control module configured to transmit the indication signal to an ultrasonic fingerprint sensor, so that the ultrasonic fingerprint sensor determines a target operating mode of the ultrasonic fingerprint sensor in response to the indication signal, and enters the target operating mode for operation.

According to an embodiment in a fifth aspect of the present disclosure, an electronic device is provided, including: a processor, a communication interface, a memory, and a communication bus, wherein the processor, the communication interface, and the memory complete communication with each other through the communication bus; the memory is configured to store a computer program; and the processor is configured to execute the method in the above first aspect or second aspect by running the computer program stored on the memory.

According to an embodiment in a sixth aspect of the present disclosure, a computer storage medium is provided, storing a computer program thereon, wherein the computer program, when executed by a processor, implements the method in the first aspect or the second aspect.

According to an embodiment in a seventh aspect of the present disclosure, a computer program product is provided, including a computer program, wherein the computer program, when executed by a processor, implements the method in the first aspect or the second aspect.

According to control solutions provided in embodiments of the present disclosure, on the one hand, the terminal device achieves a fingerprinting function using the ultrasonic fingerprint sensor. Since the ultrasonic fingerprint sensor achieves the fingerprinting function based on ultrasonic signals, and the ultrasonic signals are less affected under water, use effects of the fingerprinting function of the terminal device can be better maintained using the ultrasonic fingerprint sensor when the terminal device is used under water, compared with other types of fingerprint sensors. On the other hand, the terminal device in the control solutions of the present disclosure has a special underwater operating mode, to facilitate better satisfying the requirements for underwater use of the terminal device, thereby improving the user experience. On still another hand, since the target operating mode of the ultrasonic fingerprint sensor can be determined when the terminal device is determined to have entered the underwater operating mode, and the ultrasonic fingerprint sensor can be controlled to enter the target operating mode for operation, the ultrasonic fingerprint sensor can also enter an appropriate target operating mode for operation on the basis of ensuring that the ultrasonic fingerprint sensor can be switched on and can operate in the underwater operating mode, thereby better satisfying the user requirements for underwater use of the ultrasonic fingerprint sensor and the terminal device, and further improving the underwater use experience of the terminal device.

BRIEF DESCRIPTION OF DRAWINGS

To more clearly describe technical solutions in embodiments of the present disclosure or the prior art, drawings to be used in the description of the embodiments or the prior art will be briefly introduced below. Apparently, the drawings in the description below are merely some embodiments disclosed in the embodiments of the present disclosure. For those of ordinary skills in the art, other drawings may also be obtained based on these drawings.

DETAILED DESCRIPTION

To enable those skilled in the art to better understand technical solutions of embodiments of the present disclosure, the technical solutions of the embodiments of the present disclosure will be clearly and completely described below with reference to the drawings in the embodiments of the present disclosure. Apparently, the described embodiments are merely some, instead of all, of the embodiments of the present disclosure. All other embodiments obtained by those of ordinary skills in the art based on some embodiments among the embodiments of the present disclosure should be encompassed within the scope of protection of the embodiments of the present disclosure.

Specific implementations of the embodiments of the present disclosure will be further described below with reference to the drawings in the embodiments of the present disclosure.

Figure 1:
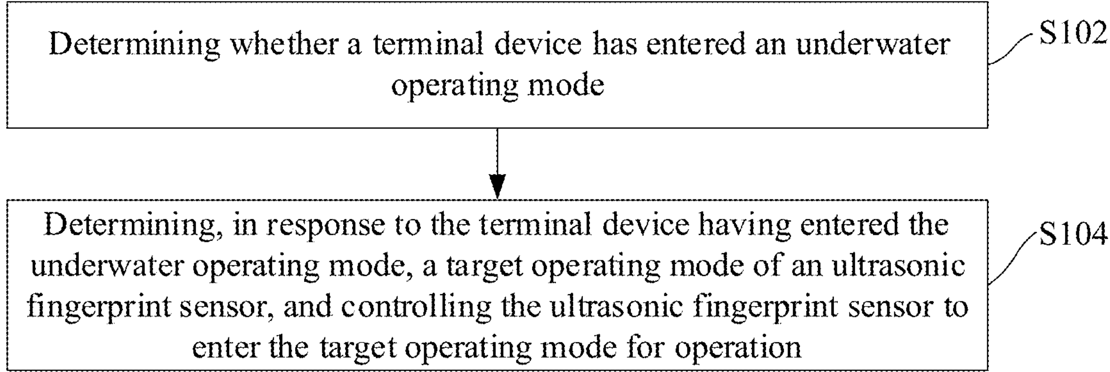
FIG. 1 is a flowchart of steps of a control method provided in an embodiment of a first aspect of the present disclosure.

FIG. 1 is a flowchart of steps of a control method provided according to an embodiment in a first aspect of the present disclosure. According to the embodiment in the first aspect of the present disclosure, a control method for an ultrasonic fingerprint sensor of a terminal device is provided. Referring to FIG. 1, the control method includes steps S102 and S104, specifically:

S102: determining whether the terminal device has entered an underwater operating mode.

The ultrasonic fingerprint sensor may be a fingerprint sensor that functions based on ultrasonic signals. Optionally, the control method provided in the first aspect of the present disclosure may be executed by the ultrasonic fingerprint sensor, for example, may be specifically executed by a processing unit (which may include any processor, such as a CPU or a MCU) inside the ultrasonic fingerprint sensor.

In the embodiment of the present disclosure, the terminal device may be an electronic device of any type, for example, may be a mobile terminal, such as a mobile phone, or a tablet computer, a computer, a server, or the like. As an example, the terminal device is a mobile phone below to facilitate understanding.

Optionally, types of the ultrasonic fingerprint sensor in the present disclosure may include at least one of a side ultrasonic fingerprint sensor, a rear ultrasonic fingerprint sensor, and an under-display ultrasonic fingerprint sensor. With the above types of ultrasonic fingerprint sensors, side fingerprint identification, rear fingerprint identification, or under-display fingerprint identification may be implemented to satisfy use requirements for the terminal device.

It should be understood that no limitation is imposed on the specific structure of the ultrasonic fingerprint sensor in the embodiments of the present disclosure in any way, as long as it can meet the requirements. Optionally, the ultrasonic fingerprint sensor in the present disclosure may include a plurality of ultrasonic subunits, each of the ultrasonic subunits may emit and receive ultrasonic signals, and the plurality of ultrasonic subunits may form an array of M columns and N rows. Each ultrasonic subunit may be equivalent to a "pixel".

Optionally, the ultrasonic subunit may include a piezoelectric material layer that may emit and receive ultrasonic signals based on piezoelectric effects. For example, in a scenario where fingerprint collection is performed using the ultrasonic fingerprint sensor, a finger may press above a detection region of the ultrasonic fingerprint sensor, and the plurality of ultrasonic subunits of the ultrasonic fingerprint sensor can emit ultrasonic signals to the finger. From emission, the ultrasonic signals can pass through a chip layer by layer, and then penetrate onto a cover plate. Then, the finger above the detection region of the ultrasonic fingerprint sensor can reflect at least a part of the ultrasonic signals to form ultrasonic echo signals carrying fingerprint information, the plurality of ultrasonic subunits receive the ultrasonic echo signals respectively, and the ultrasonic echo signals received by the ultrasonic subunits can be processed into computer-processable ultrasonic echo data. The ultrasonic fingerprint sensor may generate an ultrasonic fingerprint image based on the ultrasonic echo data, or a control unit (which may be a control unit of a terminal device, and may include any processor, such as a CPU or a MCU) electrically connected to the ultrasonic fingerprint sensor may generate the ultrasonic fingerprint image based on the ultrasonic echo data, and may further achieve the fingerprint identification function based on the ultrasonic fingerprint image. It should be understood that the description here is only an example to facilitate understanding, and does not impose any limitation on the present disclosure.

Optionally, the ultrasonic fingerprint sensor in the present disclosure may include a plurality of operating modes. For example, in some optional embodiments, the operating modes of the ultrasonic fingerprint sensor include: at least one of a fingerprint identification operating mode, a press detection operating mode, and a navigation operating mode. On this basis, the control method in the first aspect further includes:

controlling, when the ultrasonic fingerprint sensor operates in the fingerprint identification operating mode, the ultrasonic fingerprint sensor to collect ultrasonic echo data from a finger, and performing fingerprint identification based on the ultrasonic echo data; and/or controlling, when the ultrasonic fingerprint sensor operates in the press detection operating mode, the ultrasonic fingerprint sensor to collect ultrasonic echo data from the finger, and performing press detection based on the ultrasonic echo data; and/or controlling, when the ultrasonic fingerprint sensor operates in the navigation operating mode, the ultrasonic fingerprint sensor to collect ultrasonic echo data from the finger, and determining navigation control information for navigation control on the terminal device based on the ultrasonic echo data.

On this basis, in an embodiment of the present disclosure, the above plurality of operating modes of the ultrasonic fingerprint sensor contribute to satisfying different requirements for the terminal device, including but not limited to underwater use, so as to improve the underwater use effects of the ultrasonic fingerprint sensor and the terminal device.

It should be understood that the fingerprint identification may refer to generating an ultrasonic fingerprint image and performing fingerprint identification based on the ultrasonic fingerprint image; the press detection may refer to detecting whether the detection region of the ultrasonic fingerprint sensor is pressed; and the navigation control may refer to controlling the terminal device to complete a predetermined task based on detected finger movement.

It should be noted that, in an embodiment of the first aspect, the above performing fingerprint identification, performing press detection, and determining the navigation control information may be implemented by the ultrasonic fingerprint sensor (may be executed by the processing unit of the ultrasonic fingerprint sensor). In an embodiment of the control method in the second aspect below, the performing fingerprint identification, performing press detection, and determining the navigation control information may be implemented by the control unit of the terminal device, which will not be repeated here.

Optionally, the operating modes of the ultrasonic fingerprint sensor may further include a reset mode, which can be used for system reset of the ultrasonic fingerprint sensor, and is conducive to switching between the operating modes. In the reset mode, the ultrasonic fingerprint sensor is switched on, but neither emits nor receives ultrasonic signals (which may be simply understood that the ultrasonic fingerprint sensor is idle in this reset mode).

Optionally, for the case where the above ultrasonic fingerprint sensor includes M*N ultrasonic subunits, in the fingerprint identification operating mode, the M*N ultrasonic subunits can all be in an operating state of emitting and receiving ultrasonic signals. Optionally, in the press detection operating mode, a part of the M*N ultrasonic subunits may be in the operating state of emitting and receiving ultrasonic signals, while the other part may not be in such an operating state, which has the advantage of reducing power consumption; and optionally, the ultrasonic subunits of different parts may be further made to alternately enter the operating state of emitting and receiving ultrasonic signals at regular time intervals, so as to balance between time consumption and spatial uniformity. In the navigation operating mode, a manner in which the M*N ultrasonic subunits are all in the operating state of emitting and receiving ultrasonic signals may be used, or a manner in which a part of the ultrasonic subunits are in the operating state of emitting and receiving ultrasonic signals may be used.

Optionally, when the ultrasonic fingerprint sensor is in the navigation operating mode, if the navigation control information is obtained, further, navigation control of the terminal device may be performed by the control unit of the terminal device based on the navigation control information.

Optionally, in an actual application scenario, the ultrasonic fingerprint sensor in the present disclosure may operate at a detection frequency of above 10 Hz in the fingerprint identification operating mode, the press detection operating mode, or the navigation operating mode, that is, signal collection is performed at least 10 times per second to obtain at least 10 ultrasonic echo data, thereby ensuring the use effects of the ultrasonic fingerprint sensor and the terminal device.

Optionally, the terminal device in the present disclosure may be pre-set to the underwater operating mode, to facilitate underwater use of the terminal device. After the terminal device enters the underwater operating mode, some functions that are not suitable for underwater use may be switched off, for example, including but not limited to power output function, etc. Opposite to the underwater operating mode, the terminal device may also be set to a normal operating mode (or termed an air operating mode) to facilitate satisfying daily use. In the normal operating mode, some functions that are not suitable for underwater use may be switched on. When necessary, the normal operating mode of the terminal device may be switched to the underwater operating mode. The underwater operating mode may be automatically switched to by the terminal device after certain conditions are satisfied (for example, the underwater operating mode is automatically switched to in case of detecting that the terminal device has entered water), or may be manually switched to by a user (for example, in an implementation, the operating mode may be set through a setting interface of the terminal device to switch on the underwater operating mode, thereby switching the terminal device from the normal operating mode to the underwater operating mode).

In the above step S102, whether the terminal device has entered the underwater operating mode may be determined in any suitable manner. In some optional embodiments, the terminal device may automatically switch to the underwater operating mode after determining that it has entered water. In some optional embodiments, the step S102 may include: acquiring sensing data detected by a sensor of the terminal device, and determining whether the terminal device has entered the underwater operating mode based on the sensing data.

It should be understood that in this optional embodiment, the sensing data may be transmitted by the sensor to the processing unit of the ultrasonic fingerprint sensor for processing. Specifically, an appropriate sensor may be provided on the terminal device, to facilitate determining whether the terminal device has entered water based on the sensing data detected by the sensor. After entering water, the terminal device can automatically enter the underwater operating mode, thereby accurately determining whether the terminal device has entered the underwater operating mode based on the sensing data, thereby facilitating subsequent control of the operation of the ultrasonic fingerprint sensor, and improving the user experience in underwater use of the ultrasonic fingerprint sensor and underwater use of the terminal device.

Alternatively, in some other optional embodiments, the step S102 may include: acquiring a first indication signal transmitted from the control unit of the terminal device, and determining that the terminal device has entered the underwater operating mode based on the first indication signal, wherein the first indication signal is determined by the control unit based on the sensing data detected by the sensor of the terminal device.

It should be understood that in another optional embodiment, the sensing data may be transmitted by the sensor to the control unit of the terminal device. If the control unit determines that the terminal device has entered water based on the sensing data, since the terminal device can automatically enter the underwater operating mode after entering water, the control unit can generate the first indication signal for indicating that the terminal device has entered the underwater operating mode, and then the control unit transmits the first indication signal to the processing unit of the ultrasonic fingerprint sensor, so that the processing unit of the ultrasonic fingerprint sensor can accurately determine that the terminal device has entered the underwater operating mode based on the first indication signal, thereby facilitating subsequent control of the operation of the ultrasonic fingerprint sensor, and improving the user experience in underwater use of the ultrasonic fingerprint sensor and underwater use of the terminal device. It should be understood that processing the sensing data by the control unit of the terminal device is also conducive to reducing data processing volume of the ultrasonic fingerprint sensor, avoiding excessive occupancy of computational resources of the ultrasonic fingerprint sensor, and increasing the processing speed.

The type of the employed sensor is not specifically limited in the present disclosure. For example, in some optional embodiments, the sensor may be a touch sensor. Optionally, the sensing data comprises touch sensing data detected by a touch sensor of the terminal device, wherein the touch sensing data comprises at least one of capacitance data or touch area data detected by the touch sensor, and the touch area data is used to indicate a pressed area within a detection region of the touch sensor when the terminal device is touched through the touch sensor. The above "determining whether the terminal device has entered the underwater operating mode based on the sensing data" may include: determining that the terminal device has entered the underwater operating mode, in response to a variation amount of the capacitance data within first preset time satisfying a first preset condition, and/or the touch area data indicating that the pressed area reaches a second preset condition.

On this basis, in an embodiment of the present disclosure, whether the terminal device has entered the underwater operating mode can be accurately determined based on the touch sensing data and the preset conditions, thereby facilitating subsequent control of the operation of the ultrasonic fingerprint sensor, and improving the user experience in underwater use of the ultrasonic fingerprint sensor and underwater use of the terminal device.

The sensing data detected by the touch sensor includes capacitance data, that is, the touch sensor may be a capacitive touch sensor. Since the capacitance data detected by the capacitive touch sensor will change before and after the terminal device enters water, the first preset time and the first preset condition may be preset. If a variation amount of the capacitance data within the first preset time is determined to satisfy the first preset condition, the terminal device can be considered to have entered water. Since the terminal device can automatically enter the underwater operating mode after entering water, the above method can be used to accurately determine that the terminal device has entered the underwater operating mode on this basis.

Optionally, the first preset time may be set as required, for example, set to 1-2 sec. Optionally, the first preset condition may be set as required, for example, may be a threshold condition. For example, if the variation amount of the capacitance data within the first preset time is determined to exceed a preset threshold, the terminal device can be determined to have entered water, thereby accurately determining that the terminal device has entered the underwater operating mode.

Whether the terminal device has entered the underwater operating mode can be determined based on the touch area data detected by the touch sensor because after the terminal device enters water, water will press the detection region of the touch sensor over a larger area, or even the pressed area can reach 100% area of the detection region, so that the pressed area indicated by the touch area data will change significantly compared to that before the terminal device enters water. Therefore, the second preset condition may be preset. If the touch area data is determined to satisfy the second preset condition, the terminal device can be considered to have entered water. Since the terminal device can automatically enter the underwater operating mode after entering water, the above method can be used to accurately determine that the terminal device has entered the underwater operating mode on this basis.

Optionally, the second preset condition may be set as required, for example, may be a threshold condition. For example, if the touch area data is determined to indicate that the pressed area exceeds 90% area of the detection region of the touch sensor (only as an example, the threshold may be set as required), the terminal device is considered to have entered water, thereby determining that the terminal device has entered the underwater operating mode. Optionally, as an embodiment, the second preset condition may also be set such that the pressed area reaches 100% area of the detection region of the touch sensor. If the touch area data is determined to indicate that the pressed area reaches 100% area of the detection region of the touch sensor, the terminal device is considered to have entered water, thereby accurately determining that the terminal device has entered the underwater operating mode.

It should be understood that the above capacitance data and touch area data may be combined or any one of them may be selected to determine whether the terminal device has entered the underwater operating mode, which is not limited in the present disclosure.

It should be understood that the ultrasonic fingerprint sensor is also a type of sensor of the terminal device. Therefore, in some optional embodiments, whether the terminal device has entered the underwater operating mode may also be determined based on functions of the ultrasonic fingerprint sensor. Optionally, the sensing data includes ultrasonic echo data collected by the ultrasonic fingerprint sensor, and the above "determining whether the terminal device has entered the underwater operating mode based on the sensing data" includes: determining that the terminal device has entered the underwater operating mode, in response to a variation amount of the ultrasonic echo data within second preset time satisfying a third preset condition, and/or acoustic impedance data determined based on the ultrasonic echo data satisfying a fourth preset condition.

On this basis, in an embodiment of the present disclosure, whether the terminal device has entered the underwater operating mode can be accurately determined based on the ultrasonic echo data and the preset conditions, thereby facilitating subsequent control of the operation of the ultrasonic fingerprint sensor, and improving the user experience in underwater use of the ultrasonic fingerprint sensor and underwater use of the terminal device.

Optionally, when whether the terminal device has entered the underwater operating mode is determined based on the ultrasonic echo data collected by the ultrasonic fingerprint sensor, the ultrasonic fingerprint sensor may run in the press detection mode, which can effectively achieve the purpose with low power consumption.

Since the ultrasonic echo data detected by the ultrasonic fingerprint sensor will change before and after the terminal device enters water, the second preset time and the third preset condition may be preset. If a variation amount of the ultrasonic echo data within the second preset time is determined to satisfy the third preset condition, the terminal device can be considered to have entered water. Since the terminal device can automatically enter the underwater operating mode after entering water, the above method can be used to accurately determine that the terminal device has entered the underwater operating mode on this basis.

Optionally, the second preset time may be set as required, for example, set to 1-2 sec. Optionally, the third preset condition may be set as required, for example, may be a threshold condition. For example, if the variation amount of the ultrasonic echo data within the third preset time is determined to exceed a preset threshold, the terminal device can be determined to have entered water, thereby accurately determining that the terminal device has entered the underwater operating mode.

Since a propagation medium of the ultrasonic signal will change from air to water before and after the terminal device enters water, and there is a difference between an acoustic impedance of air and an acoustic impedance of water (the acoustic impedance of water is larger than the acoustic impedance of air), the acoustic impedance data can be calculated based on the ultrasonic echo data, and the fourth preset condition may be preset. If the acoustic impedance data satisfies the fourth preset condition, the terminal device can be considered to have entered water. Since the terminal device can automatically enter the underwater operating mode after entering water, the above method can be used to accurately determine that the terminal device has entered the underwater operating mode on this basis.

Optionally, the fourth preset condition may be set as required. For example, the fourth preset condition may be set as a range condition. For example, the range condition may be, for example, an acoustic impedance range of water. If the acoustic impedance data determined based on the ultrasonic echo data falls into the acoustic impedance range of water, the terminal device can be determined to have entered water, thereby accurately determining that the terminal device has entered the underwater operating mode. Alternatively, the fourth preset condition may also adopt a threshold condition. If the acoustic impedance data determined based on the ultrasonic echo data exceeds a preset threshold, the terminal device can be determined to have entered water, thereby accurately determining that the terminal device has entered the underwater operating mode. It should be understood that this only serves as an explanation to facilitate understanding, and does not impose any limitation on the present disclosure.

It should be understood that the above variation amount of the ultrasonic signal data and the acoustic impedance data may be combined or any one of them may be selected to determine whether the terminal device has entered the underwater operating mode, which is not limited in the present disclosure.

In some other optional embodiments, the determining whether the terminal device has entered the underwater operating mode in the step S102 may include: determining that the terminal device has entered the underwater operating mode, in response to the terminal device having been set by a user to the underwater operating mode.

On this basis, the terminal device can be accurately determined to have entered the underwater operating mode based on the fact that the terminal device has been set by the user to the underwater operating mode, thereby facilitating subsequent control of the operation of the ultrasonic fingerprint sensor, and improving the user experience in underwater use of the ultrasonic fingerprint sensor and underwater use of the terminal device.

For example, if the user would like to use the terminal device under water, he can preset the terminal device to the underwater operating mode as required to make preparations in advance. For example, in an implementation, settings may be made through the setting interface of the terminal device to switch on the underwater operating mode, thereby setting the terminal device to the underwater operating mode.

Optionally, the control unit of the terminal device may, after the user sets the terminal device to the underwater operating mode, generate a second indication signal for indicating that the terminal device has entered the underwater mode, and transmit the second indication signal to the ultrasonic fingerprint sensor, so that the processing unit of the ultrasonic fingerprint sensor can determine that the terminal device has entered the underwater operating mode based on the second indication signal.

S104: determining, in response to the terminal device having entered the underwater operating mode, a target operating mode of the ultrasonic fingerprint sensor, and controlling the ultrasonic fingerprint sensor to enter the target operating mode for operation.

On this basis, in the optional embodiments of the above steps S102-S104 among embodiments of the present disclosure, on the one hand, the terminal device achieves a fingerprinting function using the ultrasonic fingerprint sensor. Since the ultrasonic fingerprint sensor achieves the fingerprinting function based on ultrasonic signals, and the ultrasonic signals are less affected under water, use effects of the fingerprinting function of the terminal device can be better maintained using the ultrasonic fingerprint sensor when the terminal device is used under water, compared with other types of fingerprint sensors. On the other hand, the terminal device in the control solutions of the present disclosure has a special underwater operating mode, thereby facilitating better satisfying the requirements for underwater use of the terminal device, and improving the user experience. On still another hand, since the target operating mode of the ultrasonic fingerprint sensor can be determined when the terminal device is determined to have entered the underwater operating mode, and the ultrasonic fingerprint sensor can be controlled to enter the target operating mode for operation, the ultrasonic fingerprint sensor can also enter an appropriate target operating mode for operation on the basis of ensuring that the ultrasonic fingerprint sensor can be switched on and can operate in the underwater operating mode, thereby better satisfying the user requirements for underwater use of the ultrasonic fingerprint sensor and the terminal device, and further improving the underwater use experience of the terminal device.

Optionally, the target operating mode of the ultrasonic fingerprint sensor determined in the present disclosure may be one of the above fingerprint identification operating mode, press detection operating mode, navigation operating mode, and reset mode.

Optionally, a current operating mode of the ultrasonic fingerprint sensor may be same as the target operating mode. If the current operating mode is the same as the target operating mode, the ultrasonic fingerprint sensor may be controlled to keep the current operating mode unchanged, thus achieving the purpose of controlling the ultrasonic fingerprint sensor to enter the target operating mode for operation.

Optionally, if the current operating mode of the ultrasonic fingerprint sensor is different from the target operating mode, in a process of switching the ultrasonic fingerprint sensor from the current operating mode to the target operating mode, if the target operating mode is not the reset mode, the ultrasonic fingerprint sensor may be first controlled to enter the reset mode from the current operating mode (in the reset mode, the ultrasonic fingerprint sensor is switched on, but neither emits nor receives ultrasonic signals), and then the ultrasonic fingerprint sensor may be controlled to switch from the reset mode to the target operating mode. The ultrasonic fingerprint sensor first enters the reset state, and then completes the switching of the ultrasonic fingerprint sensor to the target operating mode, thereby improving the stability and reliability of the switching. In addition, if the target operating mode is the reset mode, the ultrasonic fingerprint sensor may be directly controlled to enter the reset mode from the current operating mode.

Optionally, in other embodiments, if the current operating mode is different from the target operating mode, and neither is the reset mode, the ultrasonic fingerprint sensor may also be directly switched from the current operating mode to the target operating mode without going through the reset mode, as required.

A specific way of determining the target operating mode of the ultrasonic fingerprint sensor is not specifically limited in the present disclosure. For example, the control unit of the terminal device may transmit a mode start signal to the processing unit of the ultrasonic fingerprint sensor, and the processing unit of the ultrasonic fingerprint sensor can receive the mode start signal from the control unit of the terminal device, to determine the target operating mode that the ultrasonic fingerprint sensor needs to enter based on the mode start signal. Then, the ultrasonic fingerprint sensor may be controlled to enter the target operating mode for operation. For example, in the navigation operating mode, after the terminal device is determined to have entered the operating mode, the control unit of the terminal device may transmit a mode start signal for switching on the navigation operating mode to the processing unit of the ultrasonic fingerprint sensor, so that the processing unit determines that the target operating mode is the navigation operating mode, and controls the ultrasonic fingerprint sensor to enter the navigation operating mode.

Alternatively, the processing unit of the ultrasonic fingerprint sensor may independently determine the target operating mode based on a preset rule. For example, it may be pre-set that the ultrasonic fingerprint sensor needs to operate in the press detection mode/fingerprint identification mode/navigation operating mode when the terminal device enters the underwater operating mode. Therefore, the target operating mode may be directly determined to be the press detection mode/fingerprint identification mode/navigation operating mode, and the ultrasonic fingerprint sensor may be controlled to enter the target operating mode for operation.

Figure 2:
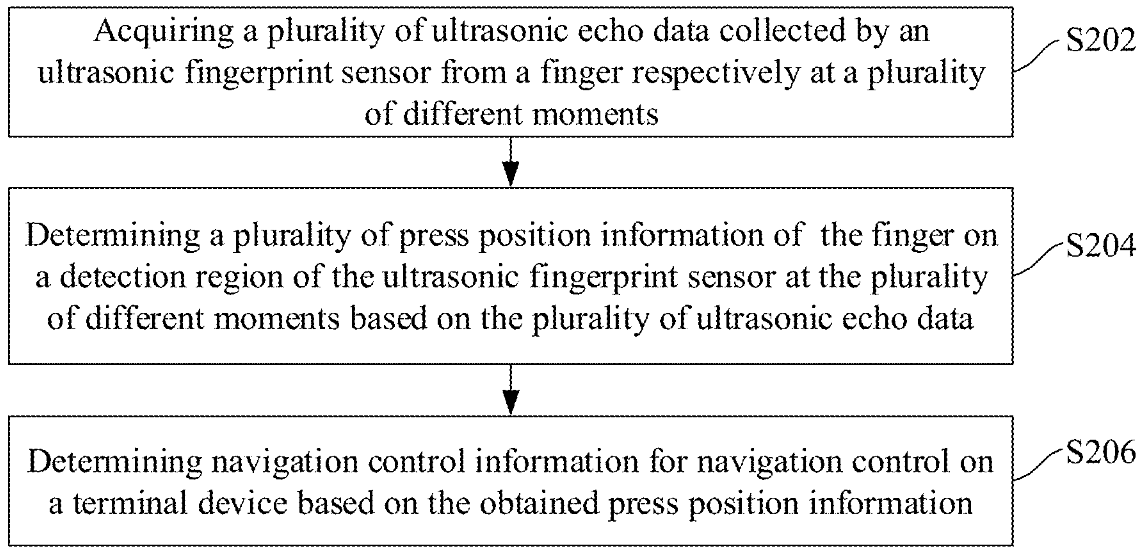
FIG. 2 is an optional flowchart for determining navigation control information in an embodiment of the present disclosure.

In the embodiment of the present disclosure, when the ultrasonic fingerprint sensor operates in the navigation operating mode, in some optional embodiments, the above "determining the navigation control information for navigation control on the terminal device based on the ultrasonic echo data" may include the following steps S202, S204, and S206 with reference to the flowchart shown in FIG. 2, specifically:

S202: acquiring a plurality of ultrasonic echo data collected by the ultrasonic fingerprint sensor from the finger respectively at a plurality of different moments.

For example, the ultrasonic fingerprint sensor may collect ultrasonic echo data from the finger respectively at n different moments to obtain n ultrasonic echo data. For example, the n different moments may be n consecutive moments at which the ultrasonic echo data is collected from the finger. n≥2, and as an example, n may be 2 below.

Optionally, the ultrasonic fingerprint sensor comprises a plurality of ultrasonic subunits, each of the ultrasonic subunits is configured to collect ultrasonic echo subdata from the finger, and ultrasonic echo data at any moment comprises a plurality of ultrasonic echo subdata collected by the plurality of ultrasonic subunits at that moment.

As an easy-to-understand example, for any moment among the n moments, if the ultrasonic fingerprint sensor comprises a total of M*N ultrasonic subunits, assume that the M*N ultrasonic subunits are all in an operating state of emitting and receiving ultrasonic signals, the M*N ultrasonic subunits can collect ultrasonic echo subdata from the finger respectively at the moment to obtain M*N ultrasonic echo subdata, and the ultrasonic data obtained by the ultrasonic fingerprint sensor at the moment includes the M*N ultrasonic echo subdata.

S204: determining a plurality of press position information of the finger on a detection region of the ultrasonic fingerprint sensor at the plurality of different moments based on the plurality of ultrasonic echo data.

For example, when n=2, as an example, 2 press position information of the finger on the detection region of the ultrasonic fingerprint sensor at n=2 different moments can be obtained based on n=2 ultrasonic echo data.

In some optional embodiments, the step S204 may include: determining, for each ultrasonic echo data among the plurality of ultrasonic echo data, echo strength distribution information corresponding to a moment at which the ultrasonic echo data is collected based on an ultrasonic echo signal strength indicated by the plurality of ultrasonic echo subdata of the ultrasonic echo data, and determining coordinates of a pressed center point position corresponding to the moment at which the ultrasonic echo data is collected based on the echo strength distribution information, wherein the echo strength distribution information is used to indicate strength distribution of ultrasonic echo subdata received by ultrasonic subunits at different positions; and determining the obtained coordinates of a plurality of pressed center point positions as the information of the plurality of pressed positions.

Ultrasonic wave is a mechanical wave. The propagation of ultrasonic wave depends on a propagation medium. An ultrasonic signal propagates in a same uniform propagation medium in a constant direction at a constant velocity. Ultrasonic wave will be reflected and transmitted at an interface of different propagation mediums, with the reflectivity and transmittivity depending on acoustic impedances and incident angles of the different mediums. Therefore, when the finger presses on the detection region of the ultrasonic fingerprint sensor, an ultrasonic signal enters skin tissue of the finger and is reflected to form an ultrasonic echo signal. Due to different contact degrees between the finger and each point within the detection region, ultrasonic echo signals of different strengths are received by the ultrasonic subunits at different positions of the ultrasonic fingerprint sensor. Generally, an ultrasonic echo signal of a largest strength is received by an ultrasonic subunit at a finger-pressed center point position, and strengths of ultrasonic echo signals received by surrounding ultrasonic subunits gradually decrease with the increase of distance from the pressed center point position.

Therefore, in the present disclosure, for each ultrasonic echo data among the plurality of ultrasonic echo data, the echo strength distribution information that can indicate strength distribution of the ultrasonic echo signals received by the ultrasonic subunits at different positions is determined based on the ultrasonic echo signal strength indicated by the plurality of ultrasonic echo subdata of the ultrasonic echo data, thereby facilitating accurately determining the coordinates of the pressed center point position corresponding to the moment at which the ultrasonic echo data is collected based on the echo strength distribution information. After the coordinates of the plurality of pressed center point positions at a plurality of moments are obtained, coordinates of each pressed center point position can represent a finger-pressed center point position in the detection region of the ultrasonic fingerprint sensor at a corresponding moment. Therefore, the coordinates of these pressed center point positions can be determined as the press position information, thereby facilitating determining the navigation control information for navigation control on the terminal device based on the obtained press position information in subsequent steps, then better achieving the finger navigation control function through the ultrasonic fingerprint sensor during underwater use of the terminal device, and improving use effects of underwater use of the terminal device for users.

The echo strength distribution information may be implemented in any suitable form, which may be, for example, an image form, a list form, a function form, etc., and may be selected as required. In some optional embodiments, the echo strength distribution information is an echo strength distribution diagram in an image form, the echo strength distribution diagram includes a plurality of image regions with one-to-one correspondence to the plurality of ultrasonic subunits, and a positional arrangement relationship between the plurality of image regions is determined based on a positional arrangement relationship between the plurality of ultrasonic subunits.

It should be understood that the echo strength distribution diagram in an image form is more convenient for calculating coordinates of a pressed center point position. For example, in an implementation below, an image coordinate system may be preset, and coordinates of a pressed center point position may be determined based on coordinates of a selected image region in the echo strength distribution diagram, which will be detailed below and will not be repeated here.

Figure 3A:
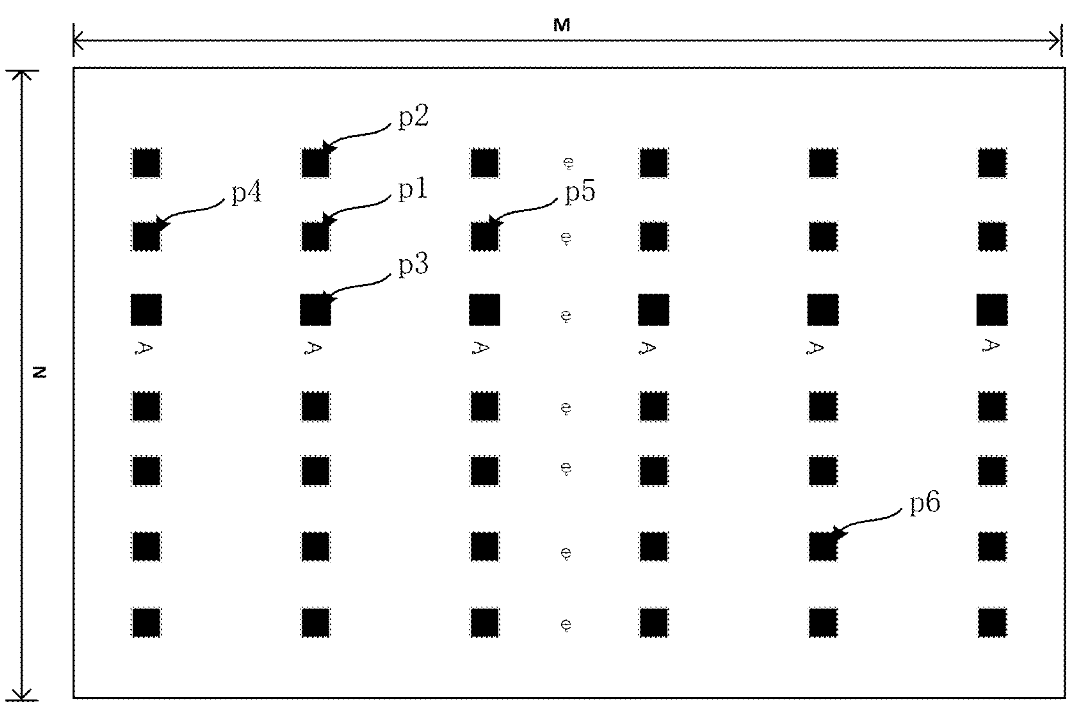
FIG. 3A is a schematic diagram of a positional arrangement of a plurality of ultrasonic subunits of some example ultrasonic fingerprint sensors in an embodiment of the present disclosure.

For example, referring to FIG. 3A, a positional arrangement of a plurality of ultrasonic subunits in some examples is shown (it should be understood that examples shown in each schematic diagram of the present disclosure are not necessarily shown to the actual scale, are only used to facilitate understanding of the technical solutions of the present disclosure, and do not impose any limitation on the present disclosure). The plurality of ultrasonic subunits are arranged in a matrix with M columns and N rows, wherein some example ultrasonic subunits p1, p2, p3, p4, p5, and p6 are located in row 2 and column 2, row 1 and column 2, row 3 and column 2, row 2 and column 1, row 2 and column 3, and row 2 from bottom and column 2 from right respectively. As another example, referring to FIG. 3B, an example of an echo strength distribution diagram corresponding to the plurality of ultrasonic subunits in FIG. 3A is shown. A plurality of image regions are also arranged in a matrix with M columns and N rows. There is one-to-one correspondence between the plurality of image regions and the plurality of ultrasonic subunits, and a positional arrangement relationship between the plurality of image regions is determined based on a positional arrangement relationship between the plurality of ultrasonic subunits. For example, there is one-to-one correspondence between some example image regions q1, q2, q3, q4, q5, and q6 in FIG. 3B and the ultrasonic subunits p1, p2, p3, p4, p5, and p6 in FIG. 3A, the image regions q1, q2, q3, q4, q5, and q6 are also correspondingly located in row 2 and column 2, row 1 and column 2, row 3 and column 2, row 2 and column 1, row 2 and column 3, row 2 from bottom and column 2 from right respectively, and other image regions may also be analogized based on the above example description. Therefore, after an image region is discovered from the echo strength distribution diagram, a corresponding ultrasonic subunit can be determined, thereby facilitating accurately determining a finger-pressed center point position and coordinates thereof at a moment, and facilitating generating the navigation control information for navigation control on the terminal device.

In some optional embodiments, the above "determining the echo strength distribution information corresponding to the moment at which the ultrasonic echo data is collected based on the ultrasonic echo signal strength indicated by the plurality of ultrasonic echo subdata of the ultrasonic echo data" may include: acquiring, for each ultrasonic echo subdata of the ultrasonic echo data, a to-be-processed echo strength distribution diagram, and assigning an image feature value to an image region corresponding to a target ultrasonic subunit in the to-be-processed echo strength distribution diagram based on the ultrasonic echo signal strength indicated by the ultrasonic echo subdata, to obtain an echo strength distribution diagram corresponding to the moment at which the ultrasonic echo data is collected after each image region of the to-be-processed echo strength distribution diagram is assigned with an image feature value; wherein the target ultrasonic subunit is an ultrasonic subunit collecting the ultrasonic echo subdata, and the to-be-processed echo strength distribution diagram is a blank echo strength distribution diagram or a historical echo strength distribution diagram.

On this basis, in the present disclosure, in the above manner, the echo strength distribution diagram corresponding to the moment at which the ultrasonic echo data is collected can be effectively obtained based on the ultrasonic echo signal strength indicated by the plurality of ultrasonic echo subdata of the ultrasonic echo data, thereby facilitating subsequently more easily and more accurately determining the coordinates of the pressed center point position corresponding to the moment at which the ultrasonic echo data is collected based on the echo strength distribution diagram (that is, the echo strength distribution information), facilitating determining the obtained coordinates of the pressed center point position as the press position information, facilitating determining the navigation control information for navigation control on the terminal device based on the obtained press position information in subsequent steps, better achieving the finger navigation control function through the ultrasonic fingerprint sensor during underwater use of the terminal device, and improving the use effects of underwater use of the terminal device for users.

Optionally, any image feature value may be used as the image feature value. For example, a saturation degree, a pixel value, or the like may be used.

Optionally, the blank echo strength distribution diagram may be an echo strength distribution diagram to which no image feature value is assigned based on the ultrasonic echo signal strength. During use, an image feature value may be directly assigned to a corresponding image region. Optionally, the historical echo strength distribution diagram may be an echo strength distribution diagram corresponding to the moment at which the ultrasonic echo data was previously collected. The historical echo strength distribution diagram may have been assigned with an image feature value, and may be re-assigned with an image feature value based on the ultrasonic echo signal strength during use.

In some optional embodiments, the above "determining the coordinates of the pressed center point position corresponding to the moment at which the ultrasonic echo data is collected based on the echo strength distribution information" may include: determining the coordinates of the pressed center point position corresponding to the moment at which the ultrasonic echo data is collected based on coordinates of an image region with a largest or smallest image feature value in the echo strength distribution diagram in a preset image coordinate system.

Referring to the above description, generally, an ultrasonic echo signal of a largest strength is received by an ultrasonic subunit at a finger-pressed center point position, and strengths of ultrasonic echo signals received by surrounding ultrasonic subunits gradually decrease, so that the image region assigned with the largest or smallest image feature value in the echo strength distribution diagram is more likely to correspond to the ultrasonic subunit at the finger-pressed center point position. Therefore, in such an optional manner, the coordinates of the pressed center point position corresponding to the moment at which the ultrasonic echo data is collected can be determined more accurately based on the echo strength distribution diagram, thereby facilitating determining the obtained coordinates of the pressed center point position as the press position information, facilitating determining the navigation control information for navigation control on the terminal device based on the obtained press position information in subsequent steps, better achieving the finger navigation control function through the ultrasonic fingerprint sensor during underwater use of the terminal device, and improving the use effects of underwater use of the terminal device for users.

It should be understood that a same rule may be used for a plurality of echo strength distribution diagrams obtained from the plurality of ultrasonic echo data, to determine the coordinates of the pressed center point position corresponding to the moment at which the ultrasonic echo data is collected. That is, an optional implementation is that: for each echo strength distribution diagram among the obtained plurality of echo strength distribution diagrams, the coordinates of the pressed center point position corresponding to the moment at which the ultrasonic echo data is collected is determined based on the coordinates of the image region with the largest image feature value in the echo strength distribution diagram in the preset image coordinate system. Alternatively, another optional implementation is that: for each echo strength distribution diagram among the obtained plurality of echo strength distribution diagrams, the coordinates of the pressed center point position corresponding to the moment at which the ultrasonic echo data is collected is determined based on the coordinates of the image region with the smallest image feature value in the echo strength distribution diagram in the preset image coordinate system.

The preset image coordinate system may be set as required. For example, an x-y rectangular coordinate system may be pre-established with a vertex (as an example, an upper left vertex of the image) of the echo strength distribution diagram as the origin, along a first direction F1 of the echo strength distribution diagram, and a second direction F2 perpendicular to the first direction F1 (referring to the example of FIG. 4, the first direction F1 may be a length direction of the echo strength distribution diagram, and the second direction F2 may be a width direction of the echo strength distribution diagram. Of course, the two may also be interchanged, that is, the first direction F1 is the width direction, and the second direction F2 is the length direction) as two coordinate axis directions. The x-y rectangular coordinate system is determined as the preset image coordinate system.

Optionally, coordinates of the plurality of image regions in the echo strength distribution diagram may be pre-stored for ease of use. Optionally, each of the image regions of the echo strength distribution diagram may include one or more pixel points, and coordinates of one of the pixel points at a center position of an image region with a largest or smallest image feature value may be determined as the coordinates of the pressed center point position. Alternatively, coordinates of any one pixel point in the image region may be selected as required to determine the coordinates of the pressed center point position. Alternatively, in another optional embodiment, coordinates may also be assigned to each image region based on positional arrangement. For example, as understood from FIG. 3B, coordinates (2, 2) may be assigned to the image region q1 in row 2 and column 2, coordinates (2, 1) may be assigned to the image region q2 in row 1 and column 2, coordinates (2, 3) may be assigned to the image region q3 in row 3 and column 2, coordinates (1, 2) may be assigned to the image region q4 in row 2 and column 1, coordinates (3, 2) may be assigned to the image region q5 in row 2 and column 3, and the other image regions may be analogized. When necessary, coordinates of a selected image region may be determined as the coordinates of the pressed center point position. It should be understood that a specific implementation may be optionally selected as required, and is not specifically limited here in the present disclosure.

Optionally, when an image feature value is allocated to an image region based on the ultrasonic echo signal strength indicated by the ultrasonic echo subdata, the image feature value may be directly proportional to the ultrasonic echo signal strength, or may be inversely proportional to the ultrasonic echo signal strength. When the image feature value is directly proportional to the ultrasonic echo signal strength, the greater the ultrasonic echo signal strength is, the larger the image feature value is. Then, the coordinates of the pressed center point position corresponding to the moment at which the ultrasonic echo data is collected may be determined based on the coordinates of the image region with the largest image feature value in the echo strength distribution diagram in the preset image coordinate system. When the image feature value inversely proportional to the ultrasonic echo signal strength, the greater the strength of the ultrasonic echo signal is, the smaller the image feature value is. Then, the coordinates of the pressed center point position corresponding to the moment at which the ultrasonic echo data is collected may be determined based on the coordinates of the image region with the smallest image feature value in the echo strength distribution diagram in the preset image coordinate system.

Figure 3B:
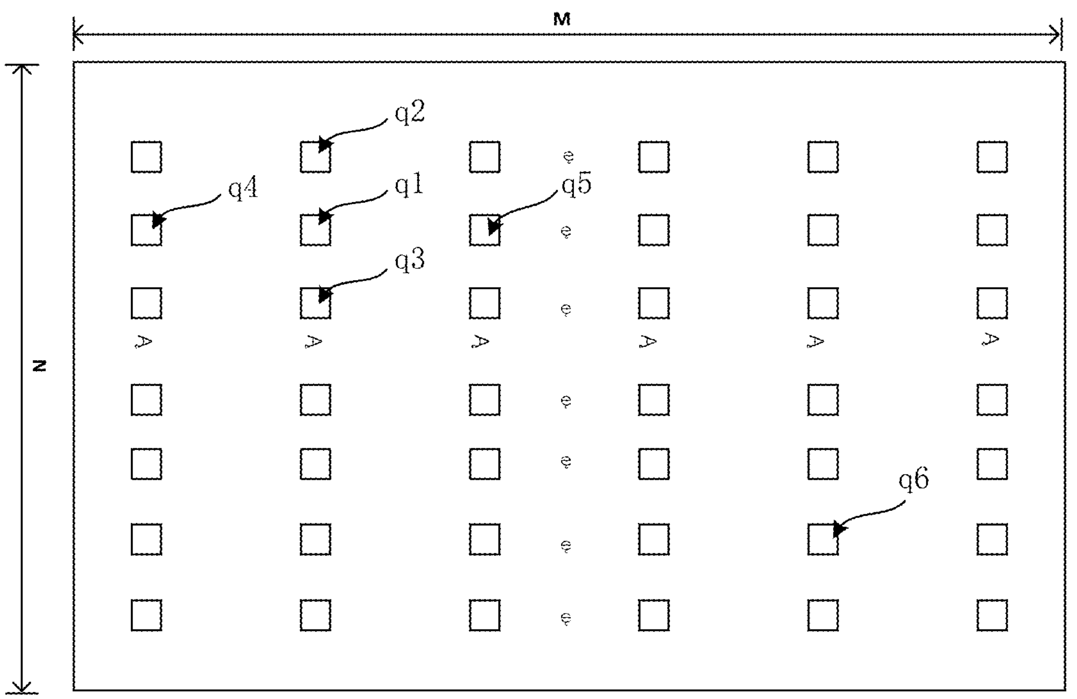
FIG. 3B is an optional schematic diagram of an echo strength distribution diagram corresponding to the plurality of ultrasonic subunits in FIG. 3A.
Figure 4:
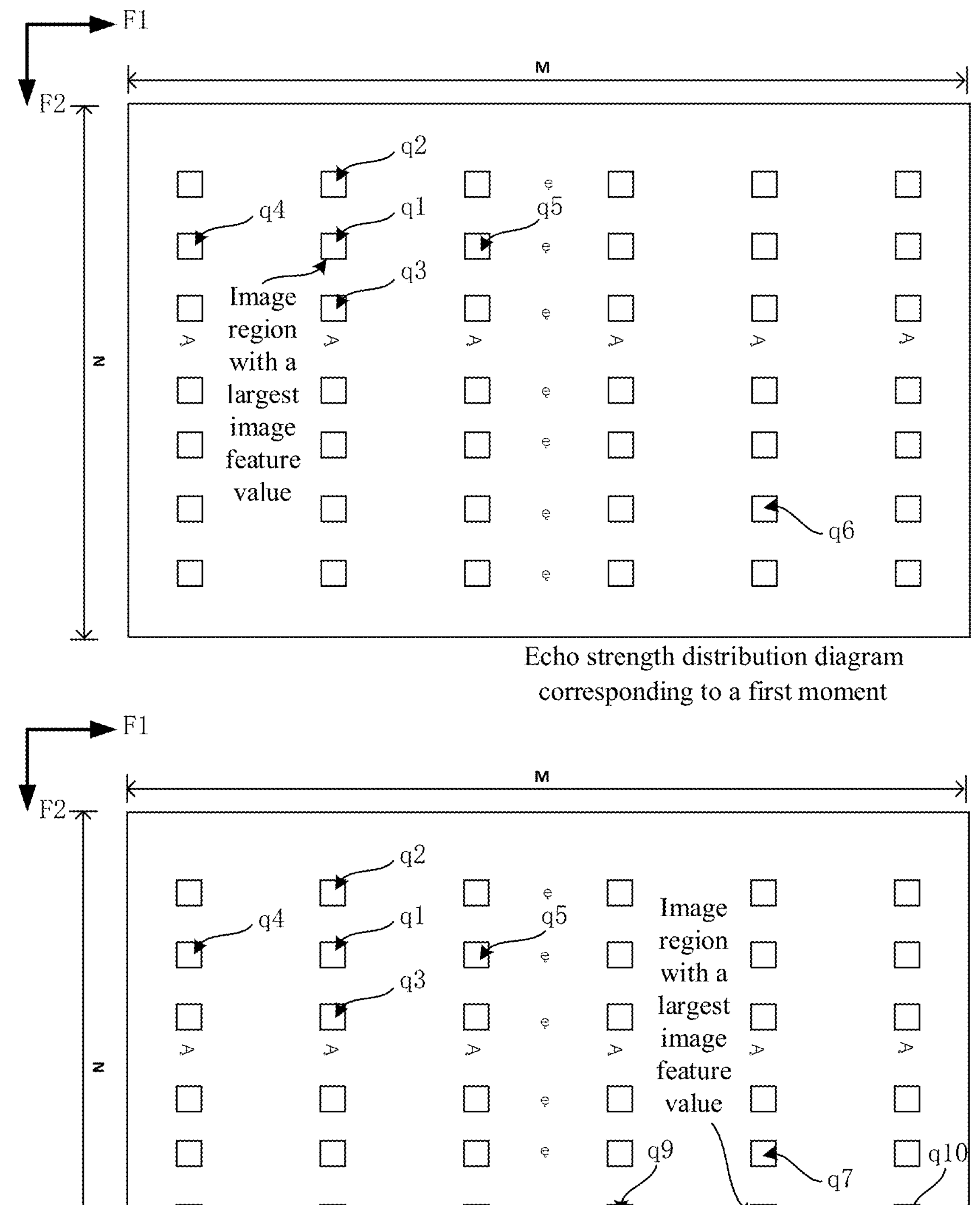
FIG. 4 is echo strength distribution diagrams corresponding to 2 different moments in an example.

Example processes of determining the echo strength distribution diagram and calculating the coordinates of the pressed center point position are described below with reference to FIGS. 3A, 3B, and 4. For example, a first ultrasonic echo data among 2 ultrasonic echo data is collected by the ultrasonic fingerprint sensor at n=2 moments. Assume that the ultrasonic fingerprint sensor includes M*N ultrasonic subunits (referring to FIG. 3A as an example), each of which receives the ultrasonic echo signal from the finger, the first ultrasonic echo data includes M*N ultrasonic echo subdata collected by the M*N ultrasonic subunits. The to-be-processed echo strength distribution diagram may be acquired. For example, the to-be-processed echo strength distribution diagram is the echo strength distribution diagram in FIG. 3B (here, it may be regarded as the blank echo strength distribution diagram for example understanding), then an image feature value is assigned to the image region q1 in the to-be-processed echo distribution diagram based on the ultrasonic echo signal strength indicated by the ultrasonic echo subdata collected by the ultrasonic subunit p1, an image feature value is assigned to the image region q2 in the to-be-processed echo distribution diagram based on the ultrasonic echo signal strength indicated by the ultrasonic echo subdata collected by the ultrasonic subunit p2, an image feature value is assigned to the image region q3 in the to-be-processed echo distribution diagram based on the ultrasonic echo signal strength indicated by the ultrasonic echo subdata collected by the ultrasonic subunit p3, and by analogy, image feature values are assigned to other image regions in other to-be-processed echo distribution diagrams, thereby obtaining an echo strength distribution diagram corresponding to a moment at which the first ultrasonic echo data is collected. As an example, the image feature value is a saturation degree. Assume that a largest ultrasonic echo signal strength is indicated by the ultrasonic echo subdata collected by the ultrasonic subunit p1, a largest image feature value is also assigned to the image region q1. Referring to an echo strength distribution diagram corresponding to a first moment shown in FIG. 4, along the first direction F1, image feature values assigned to the image region q5 and other image regions will gradually decrease (when the ultrasonic echo signal strength is too low, image feature values of the plurality of image regions may also be set to 0 based on the ultrasonic echo signal strength). Similarly, along the second direction F2, along an opposite direction of the first direction F1, or along an opposite direction of the second direction F2, the image feature values assigned to other image regions will also gradually decrease. In this way, the echo strength distribution diagram corresponding to the first moment is processed. Based on a magnitude of an image feature value of each image region, coordinates of the image region q1 with the largest image feature value in the preset image coordinate system may be determined, and coordinates (x1, y1) of a pressed center point position corresponding to the first moment at which the first ultrasonic echo data is collected may be determined.

As an example, a second ultrasonic echo data among the 2 ultrasonic echo data is collected by the ultrasonic fingerprint sensor at n=2 moments. The blank echo strength distribution diagram or the echo strength distribution at the first moment may be used as the to-be-processed echo strength distribution diagram. As an example, assume that the echo strength distribution diagram at the first moment is used as the to-be-processed echo strength distribution diagram, image feature values are reassigned to image regions in the to-be-processed echo distribution diagram based on the ultrasonic echo signal strength indicated by the ultrasonic echo subdata collected by each ultrasonic subunit (which may be understood with reference to the above description, and will not be repeated here), thereby obtaining an echo strength distribution diagram corresponding to a moment at which the second ultrasonic echo data is collected. As an example, the image feature value is a saturation degree. Assume that a largest ultrasonic echo signal strength is indicated by the ultrasonic echo subdata collected by the ultrasonic subunit p6 corresponding to the image region q6, a largest image feature value is also assigned to the image region q6. Referring to an echo strength distribution diagram corresponding to a second moment shown in FIG. 4, along the first direction F1, the second direction F2, the opposite direction of the first direction F1, or the opposite direction of the second direction F2, image feature values assigned to the image regions q10, q9, q8, q7, and other image regions will gradually decrease along each of the directions. In this way, an echo strength distribution diagram corresponding to the second moment is processed. Based on a magnitude of an image feature value of each image region, coordinates of the image region q6 with the largest image feature value in the preset image coordinate system may be determined, and coordinates (x2, y2) of a pressed center point position corresponding to the second moment at which the second ultrasonic echo data is collected may be determined.

Figure 5:
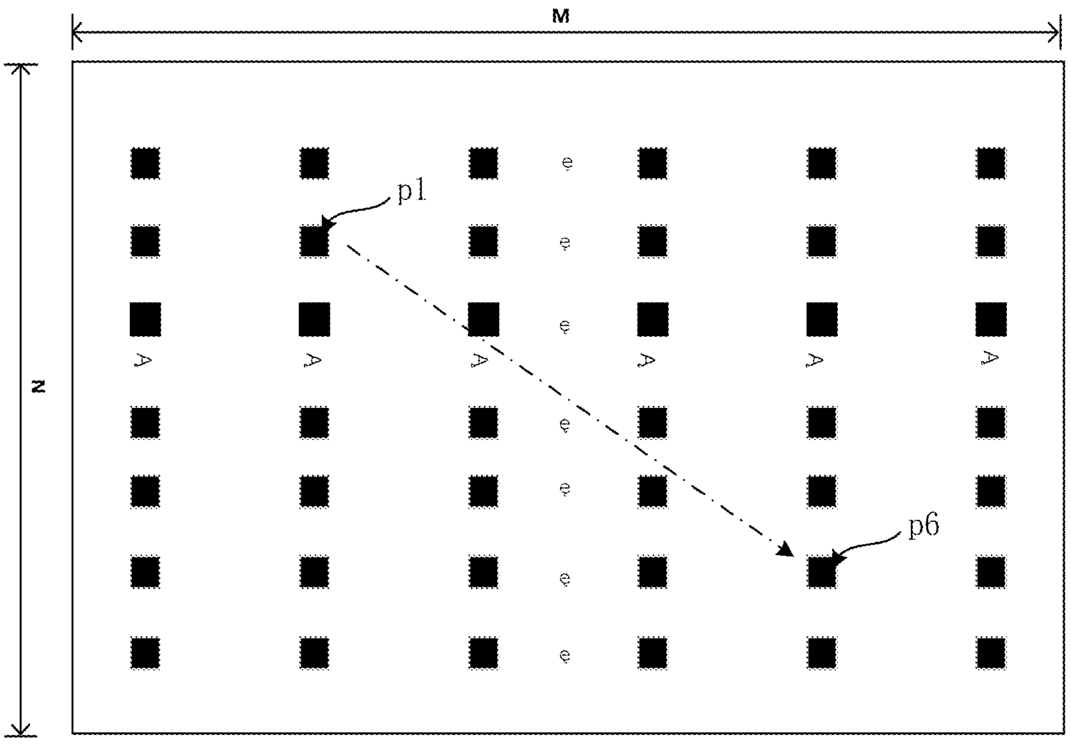
FIG. 5 is a schematic diagram of position changes of finger-pressed center points corresponding to the 2 different moments in FIG. 4.

Then, the obtained coordinates (x1, y1) and (x2, y2) of the 2 pressed center point positions may be determined as information of the plurality of pressed positions for calculating the navigation control information in subsequent steps. The above example description shows that the finger-pressed center point position in the detection region of the ultrasonic fingerprint sensor moves from a position of the ultrasonic subunit p1 corresponding to the image region q1 to a position of the ultrasonic subunit p6 corresponding to the image region q6 at 2 moments (referring to FIG. 5). It can be understood that in another case, if the obtained coordinates of the 2 pressed center point positions are the same, it means that the finger does not move from the first moment to the second moment. It should be understood that the above example description does not impose any limitation on embodiments of the present disclosure.

S206: determining navigation control information for navigation control on the terminal device based on the obtained press position information.

On this basis, in an optional embodiment of the above steps S202-S206 of the present disclosure, the plurality of ultrasonic echo data collected by the ultrasonic fingerprint sensor from the finger respectively at the plurality of different moments are acquired, and then the plurality pressed position information of the finger on the detection region of the ultrasonic fingerprint sensor at the plurality of different moments is determined based on the plurality of ultrasonic echo data, thereby accurately and effectively determining the navigation control information for navigation control on the terminal device based on the obtained press position information, then better achieving the finger navigation control function through the ultrasonic fingerprint sensor during underwater use of the terminal device, and improving the use effects of underwater use of the terminal device for users.

It should be understood that the finger movement can be characterized by determining changes of the press position information. Therefore, the obtained press position information is calculated to obtain the navigation control information, thereby facilitating finger navigation.

In some optional embodiments, the step S206 may include: determining movement information of the finger on the detection region of the ultrasonic fingerprint sensor based on the coordinates of the plurality of pressed center point positions, wherein the movement information includes at least one of a movement direction, a movement distance, or a movement velocity; and determining the navigation control information for navigation control on the terminal device based on the movement information.

Optionally, as an example, based on the above coordinates (x1, y1) and (x2, y2) of the pressed center point positions, the finger may be detected to move from the corresponding position of the ultrasonic subunit p1 to the corresponding position of the ultrasonic subunit p6 in the detection region of the ultrasonic fingerprint sensor from the first moment to the second moment, and then the movement direction of the finger in the detection region of the ultrasonic fingerprint sensor may be determined based on the coordinates (x1, y1) and (x2, y2); the movement distance of the finger in the detection region of the ultrasonic fingerprint sensor may be calculated based on the coordinates (x1, y1, y1) and (x2, y2) and physical size data of the ultrasonic subunits of the ultrasonic fingerprint sensor; the movement velocity of the finger in the detection region of the ultrasonic fingerprint sensor may be calculated based on the movement distance and a time interval from the first moment to the second moment; and then the obtained result may be used as the movement information. Further, the navigation control information for navigation control on the terminal device may be determined based on the movement information.

Optionally, the navigation control information may include, but is not limited to, at least one of a navigation control signal, a navigation control parameter, and the like. Some navigation control information corresponding to different styles of movement information may be preset. After the movement information is determined, the navigation control information corresponding to the movement information may be determined. After obtaining the navigation control information, the control unit of the terminal device may perform corresponding navigation control on the terminal device based on the navigation control information, so that the terminal device completes a scheduled task.

On this basis, in the present disclosure, the movement information of the finger on the detection region of the ultrasonic fingerprint sensor is determined based on the coordinates of the plurality of pressed center point positions, thereby accurately and effectively determining the navigation control information for navigation control on the terminal device, then better achieving the finger navigation control function through the ultrasonic fingerprint sensor during underwater use of the terminal device, and improving the use effects of underwater use of the terminal device for users.

It should be understood that the above example description of the control method provided in an embodiment of the first aspect of the present disclosure does not impose any limitation on the embodiments of the present disclosure.

Figure 6:
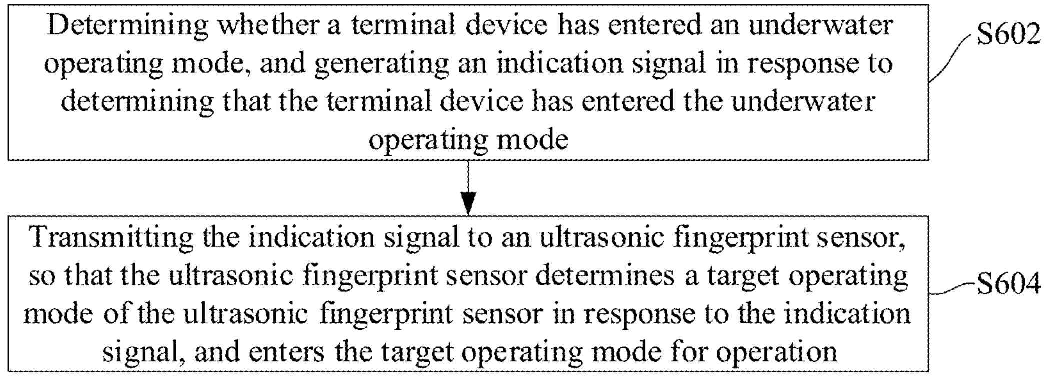
FIG. 6 is a flowchart of steps of a control method provided in an embodiment of a second aspect of the present disclosure.

FIG. 6 is a flowchart of steps of a control method provided in an embodiment of a second aspect of the present disclosure. According to an embodiment in the second aspect of the present disclosure, a control method for a control unit of a terminal device is provided. Referring to FIG. 6, the control method includes steps S602 and S604, specifically:

S602: determining whether the terminal device has entered an underwater operating mode, and generating an indication signal in response to determining that the terminal device has entered the underwater operating mode.

S604: transmitting the indication signal to an ultrasonic fingerprint sensor, so that the ultrasonic fingerprint sensor determines a target operating mode of the ultrasonic fingerprint sensor in response to the indication signal, and enters the target operating mode for operation.

On this basis, in an optional embodiment of the above steps S602-S604 in the present disclosure, on the one hand, the terminal device achieves a fingerprinting function using the ultrasonic fingerprint sensor. Since the ultrasonic fingerprint sensor achieves the fingerprinting function based on ultrasonic signals, and the ultrasonic signals are less affected under water, use effects of the fingerprinting function of the terminal device can be better maintained using the ultrasonic fingerprint sensor when the terminal device is used under water, compared with other types of fingerprint sensors. On the other hand, the terminal device in the control solutions of the present disclosure has a special underwater operating mode, thereby facilitating better satisfying the requirements for underwater use of the terminal device, and improving the user experience. On still another hand, since the indication signal is generated when the terminal device is determined to have entered the underwater operating mode, and is transmitted to the ultrasonic fingerprint sensor, so that the ultrasonic fingerprint sensor can determine that the ultrasonic fingerprint sensor has entered the underwater mode based on the indication signal, determine the target operating mode of the ultrasonic fingerprint sensor in response to the indication signal, and enter the target operating mode for operation, so that the ultrasonic fingerprint sensor can also enter an appropriate target operating mode for operation on the basis of ensuring that the ultrasonic fingerprint sensor can be switched on and can operate in the underwater operating mode, thereby better satisfying the user requirements for underwater use of the ultrasonic fingerprint sensor and the terminal device, and further improving the underwater use experience of the terminal device.

It should be understood that the control method provided in the second aspect of the present disclosure may be executed by the control unit of the terminal device. The relevant content in the embodiment of the control method in the above first aspect may be referred to for understanding of the introduction to relevant contents, such as the ultrasonic fingerprint sensor, the terminal device, the underwater operating mode, and the target operating mode, and may be referred to for understanding of other relevant contents, which will not be repeated here.

In some optional embodiments, types of the ultrasonic fingerprint sensor in the present disclosure may include at least one of a side ultrasonic fingerprint sensor, a rear ultrasonic fingerprint sensor, and an under-display ultrasonic fingerprint sensor. With the above types of ultrasonic fingerprint sensors, side fingerprint identification, rear fingerprint identification, or under-display fingerprint identification may be implemented to satisfy use requirements for the terminal device.

In some optional embodiments, the operating modes of the ultrasonic fingerprint sensor include: at least one of a fingerprint identification operating mode, a press detection operating mode, and a navigation operating mode. On this basis, the control method in the second aspect further includes: acquiring, when the ultrasonic fingerprint sensor operates in the fingerprint identification operating mode, ultrasonic echo data collected by the ultrasonic fingerprint sensor from a finger, and performing fingerprint identification based on the ultrasonic echo data; and/or acquiring, when the ultrasonic fingerprint sensor operates in the press detection operating mode, ultrasonic echo data collected by the ultrasonic fingerprint sensor from the finger, and performing press detection based on the ultrasonic echo data; and/or acquiring, when the ultrasonic fingerprint sensor operates in the navigation operating mode, ultrasonic echo data collected by the ultrasonic fingerprint sensor from the finger, and determining navigation control information for navigation control on the terminal device based on the ultrasonic echo data.

On this basis, in an embodiment of the present disclosure, the above plurality of operating modes of the ultrasonic fingerprint sensor contribute to satisfying different requirements for the terminal device, including but not limited to underwater use, so as to improve the underwater use effects of the ultrasonic fingerprint sensor and the terminal device. It should be understood that the above optional embodiments have been described in detail in the embodiment of the control method in the first aspect. The difference is that the control unit of the terminal device needs to acquire the ultrasonic echo data from the ultrasonic fingerprint sensor, and the control unit implements the above fingerprint identification, press detection, and determination of the navigation control information. The details may be understood with reference to the embodiment of the control method in the first aspect, and will not be repeated here.

In some optional embodiments, the indication signal includes a first indication signal; and the step S604 may include: acquiring sensing data detected by a sensor of the terminal device, determining whether the terminal device has entered the underwater operating mode based on the sensing data, and generating the first indication signal in response to determining that the terminal device has entered the underwater operating mode. Further, in the step S604, the first indication signal may be transmitted to the ultrasonic fingerprint sensor, so that the ultrasonic fingerprint sensor determines that the terminal device has entered the underwater operating mode in response to the first indication signal, determines a target operating mode of the ultrasonic fingerprint sensor, and enters the target operating mode for operation.

It should be understood that the "acquiring the sensing data detected by the sensor of the terminal device, determining whether the terminal device has entered the underwater operating mode based on the sensing data" in the above optional embodiments may be understood with reference to the relevant content in the embodiment of the control method in the above first aspect. The difference between this and the above embodiments is that the sensing data here is transmitted by the sensor to the control unit of the terminal device for processing, while in an embodiment of the first aspect, the sensing data is transmitted by the sensor to the processing unit of the ultrasonic fingerprint sensor for processing. The specific implementation details and principles are similar, and therefore will not be repeated here.

In addition, the first indication signal has been correspondingly described in an embodiment of the above first aspect, and may be understood in combination. Specifically, in the above optional embodiments, if the control unit determines that the terminal device has entered water based on the sensing data, since the terminal device can automatically enter the underwater operating mode after entering water, the control unit can generate the first indication signal for indicating that the terminal device has entered the underwater operating mode, and then the control unit transmits the first indication signal to the processing unit of the ultrasonic fingerprint sensor, so that the processing unit of the ultrasonic fingerprint sensor can accurately determine that the terminal device has entered the underwater operating mode based on the first indication signal, thereby facilitating subsequent control of the operation of the ultrasonic fingerprint sensor, and improving the user experience in underwater use of the ultrasonic fingerprint sensor and underwater use of the terminal device. It should be understood that processing the sensing data by the control unit of the terminal device is also conducive to reducing data processing volume of the ultrasonic fingerprint sensor, avoiding excessive occupancy of computational resources of the ultrasonic fingerprint sensor, and increasing the processing speed.

In some optional embodiments, the sensor may be a touch sensor. Optionally, the sensing data comprises touch sensing data detected by a touch sensor of the terminal device, wherein the touch sensing data comprises at least one of capacitance data or touch area data detected by the touch sensor, and the touch area data is used to indicate a pressed area within a detection region of the touch sensor when the terminal device is touched through the touch sensor; and the above "determining whether the terminal device has entered the underwater operating mode based on the sensing data" includes: determining that the terminal device has entered the underwater operating mode, in response to a variation amount of the capacitance data within first preset time satisfying a first preset condition, and/or the touch area data indicating that the pressed area reaches a second preset condition.

On this basis, in an embodiment of the present disclosure, whether the terminal device has entered the underwater operating mode can be accurately determined based on the touch sensing data and the preset conditions, thereby facilitating subsequent control of the operation of the ultrasonic fingerprint sensor, and improving the user experience in underwater use of the ultrasonic fingerprint sensor and underwater use of the terminal device. It should be understood that the above optional embodiments may be understood with reference to the relevant content in the embodiment of the control method in the above first aspect. The difference between this and the above embodiments is that here, the control unit of the terminal device is used for processing, while in an embodiment of the first aspect, the processing unit of the ultrasonic fingerprint sensor is used for processing. The specific implementation details and principles are similar, and therefore will not be repeated here.

In some optional embodiments, the sensing data includes ultrasonic echo data collected by the ultrasonic fingerprint sensor, and the above "determining whether the terminal device has entered the underwater operating mode based on the sensing data" includes: determining that the terminal device has entered the underwater operating mode, in response to a variation amount of the ultrasonic echo data within second preset time satisfying a third preset condition, and/or acoustic impedance data determined based on the ultrasonic echo data satisfying a fourth preset condition.

On this basis, in an embodiment of the present disclosure, whether the terminal device has entered the underwater operating mode can be accurately determined based on the ultrasonic echo data and the preset conditions, thereby facilitating subsequent control of the operation of the ultrasonic fingerprint sensor, and improving the user experience in underwater use of the ultrasonic fingerprint sensor and underwater use of the terminal device. It should be understood that the above optional embodiments may be understood with reference to the relevant content in the embodiment of the control method in the above first aspect. The difference between this and the above embodiments is that here, the control unit of the terminal device is used for processing, while in an embodiment of the first aspect, the processing unit of the ultrasonic fingerprint sensor is used for processing. The specific implementation details and principles are similar, and therefore will not be repeated here.

In some optional embodiments, the indication signal includes a second indication signal; and the step S602 may include: determining whether the terminal device has been set by a user to the underwater operating mode, determining that the terminal device has entered the underwater operating mode in response to an indication that the terminal device has been set by the user to the underwater operating mode, and generating a second indication signal. Further, in the step S604, the second indication signal may be transmitted to the ultrasonic fingerprint sensor, so that the ultrasonic fingerprint sensor determines that the terminal device has entered the underwater operating mode in response to the second indication signal, determines a target operating mode of the ultrasonic fingerprint sensor, and enters the target operating mode for operation.

On this basis, the terminal device can be accurately determined to have entered the underwater operating mode based on the fact that the terminal device has been set by the user to the underwater operating mode, thereby facilitating subsequent control of the operation of the ultrasonic fingerprint sensor, and improving the user experience in underwater use of the ultrasonic fingerprint sensor and underwater use of the terminal device.

For example, if the user would like to use the terminal device under water, he can preset the terminal device to the underwater operating mode as required to make preparations in advance. For example, in an implementation, settings may be made through the setting interface of the terminal device to switch on the underwater operating mode, thereby setting the terminal device to the underwater operating mode.

In addition, the second indication signal has been correspondingly described in an embodiment of the above first aspect. Optionally, the control unit of the terminal device may, after the user sets the terminal device to the underwater operating mode, generate a second indication signal for indicating that the terminal device has entered the underwater mode, and transmit the second indication signal to the ultrasonic fingerprint sensor, so that the processing unit of the ultrasonic fingerprint sensor can determine that the terminal device has entered the underwater operating mode based on the second indication signal.

In some optional embodiments, the above "determining the navigation control information for navigation control on the terminal device based on the ultrasonic echo data" includes: acquiring a plurality of ultrasonic echo data collected by the ultrasonic fingerprint sensor from the finger respectively at a plurality of different moments; determining a plurality of press position information of the finger on a detection region of the ultrasonic fingerprint sensor at the plurality of different moments based on the plurality of ultrasonic echo data; and determining the navigation control information for navigation control on the terminal device based on the obtained press position information.

On this basis, in the above optional embodiments of the present disclosure, the plurality of ultrasonic echo data collected by the ultrasonic fingerprint sensor from the finger respectively at the plurality of different moments are acquired, and then the plurality of press position information of the finger on the detection region of the ultrasonic fingerprint sensor at the plurality of different moments is determined based on the plurality of ultrasonic echo data, thereby accurately and effectively determining the navigation control information for navigation control on the terminal device based on the obtained press position information, then better achieving the finger navigation control function through the ultrasonic fingerprint sensor during underwater use of the terminal device, and improving the use effects of underwater use of the terminal device for users. It should be understood that the above optional embodiments may be understood with reference to the relevant content of the "steps S202-S206" in the embodiment of the control method in the first aspect. The difference between this and the above embodiments is that here, the control unit of the terminal device is used for processing, while the "steps S202-S206" in an embodiment of the first aspect are processed by the processing unit of the ultrasonic fingerprint sensor. The specific implementation details and principles are similar, and therefore will not be repeated here.

In some optional embodiments, the ultrasonic fingerprint sensor includes a plurality of ultrasonic subunits, each of the ultrasonic subunits is configured to collect ultrasonic echo subdata from the finger, ultrasonic echo data at any moment includes a plurality of ultrasonic echo subdata collected by the plurality of ultrasonic subunits at that moment; and the above "determining the plurality of press position information of the finger on the detection region of the ultrasonic fingerprint sensor at the plurality of different moments based on the plurality of ultrasonic echo data" includes: determining, for each ultrasonic echo data among the plurality of ultrasonic echo data, echo strength distribution information corresponding to a moment at which the ultrasonic echo data is collected based on an ultrasonic echo signal strength indicated by the plurality of ultrasonic echo subdata of the ultrasonic echo data, and determining coordinates of a pressed center point position corresponding to the moment at which the ultrasonic echo data is collected based on the echo strength distribution information, wherein the echo strength distribution information is used to indicate strength distribution of ultrasonic echo signals received by ultrasonic subunits at different positions; and determining the obtained coordinates of a plurality of pressed center point positions as the information of the plurality of pressed positions.

On this basis, in the present disclosure, for each ultrasonic echo data among the plurality of ultrasonic echo data, the echo strength distribution information that can indicate strength distribution of the ultrasonic echo signals received by the ultrasonic subunits at different positions is determined based on the ultrasonic echo signal strength indicated by the plurality of ultrasonic echo subdata of the ultrasonic echo data, thereby facilitating accurately determining the coordinates of the pressed center point position corresponding to the moment at which the ultrasonic echo data is collected based on the echo strength distribution information. After the coordinates of the plurality of pressed center point positions at a plurality of moments are obtained, coordinates of each pressed center point position can represent a finger-pressed center point position in the detection region of the ultrasonic fingerprint sensor at a corresponding moment. Therefore, the coordinates of these pressed center point positions can be determined as the press position information, thereby facilitating determining the navigation control information for navigation control on the terminal device based on the obtained press position information in subsequent steps, then better achieving the finger navigation control function through the ultrasonic fingerprint sensor during underwater use of the terminal device, and improving use effects of underwater use of the terminal device for users. It should be understood that the above optional embodiments may be understood with reference to the relevant content of the "step S204" in the embodiment of the control method in the first aspect. The difference between this and the above embodiments is that here, the control unit of the terminal device is used for processing, while in an embodiment of the first aspect, the processing unit of the ultrasonic fingerprint sensor is used for processing. The specific implementation details and principles are similar, and therefore will not be repeated here.

In some optional embodiments, the echo strength distribution information is an echo strength distribution diagram in an image form, the echo strength distribution diagram includes a plurality of image regions with one-to-one correspondence to the plurality of ultrasonic echo subunits, a positional arrangement relationship between the plurality of image regions is determined based on a positional arrangement relationship between the plurality of ultrasonic subunits; and the above "determining the echo strength distribution information corresponding to the moment at which the ultrasonic echo data is collected based on the ultrasonic echo signal strength indicated by the plurality of ultrasonic echo subdata of the ultrasonic echo data" includes: acquiring, for each ultrasonic echo subdata of the ultrasonic echo data, a to-be-processed echo strength distribution diagram, and assigning an image feature value to an image region corresponding to a target ultrasonic subunit in the to-be-processed echo strength distribution diagram based on the ultrasonic echo signal strength indicated by the ultrasonic echo subdata, to obtain an echo strength distribution diagram corresponding to the moment at which the ultrasonic echo data is collected after each image region of the to-be-processed echo strength distribution diagram is assigned with an image feature value; wherein the target ultrasonic subunit is an ultrasonic subunit collecting the ultrasonic echo subdata, and the to-be-processed echo strength distribution diagram is a blank echo strength distribution diagram or a historical echo strength distribution diagram.

On this basis, in the present disclosure, in the above manner, the echo strength distribution diagram corresponding to the moment at which the ultrasonic echo data is collected can be effectively obtained based on the ultrasonic echo signal strength indicated by the plurality of ultrasonic echo subdata of the ultrasonic echo data, thereby facilitating subsequently more easily and more accurately determining the coordinates of the pressed center point position corresponding to the moment at which the ultrasonic echo data is collected based on the echo strength distribution diagram (that is, the echo strength distribution information), facilitating determining the obtained coordinates of the pressed center point position as the press position information, facilitating determining the navigation control information for navigation control on the terminal device based on the obtained press position information in subsequent steps, better achieving the finger navigation control function through the ultrasonic fingerprint sensor during underwater use of the terminal device, and improving the use effects of underwater use of the terminal device for users. It should be understood that the above optional embodiments may be understood with reference to the relevant content of the "step S204" in the embodiment of the control method in the first aspect. The difference between this and the above embodiments is that here, the control unit of the terminal device is used for processing, while in an embodiment of the first aspect, the processing unit of the ultrasonic fingerprint sensor is used for processing. The specific implementation details and principles are similar, and therefore will not be repeated here.

In some optional embodiments, the "determining the coordinates of the pressed center point position corresponding to the moment at which the ultrasonic echo data is collected based on the echo strength distribution information" includes: determining the coordinates of the pressed center point position corresponding to the moment at which the ultrasonic echo data is collected based on coordinates of an image region with a largest or smallest image feature value in the echo strength distribution diagram in a preset image coordinate system.

On this basis, in such an optional manner, the coordinates of the pressed center point position corresponding to the moment at which the ultrasonic echo data is collected can be determined more accurately based on the echo strength distribution diagram, thereby facilitating determining the obtained coordinates of the pressed center point position as the press position information, facilitating determining the navigation control information for navigation control on the terminal device based on the obtained press position information in subsequent steps, better achieving the finger navigation control function through the ultrasonic fingerprint sensor during underwater use of the terminal device, and improving the use effects of underwater use of the terminal device for users. It should be understood that the above optional embodiments may be understood with reference to the relevant content of the "step S204" in the embodiment of the control method in the first aspect. The difference between this and the above embodiments is that here, the control unit of the terminal device is used for processing, while in an embodiment of the first aspect, the processing unit of the ultrasonic fingerprint sensor is used for processing. The specific implementation details and principles are similar, and therefore will not be repeated here.

In some optional embodiments, the "determining the navigation control information for navigation control on the terminal device based on the obtained press position information" includes: determining movement information of the finger on the detection region of the ultrasonic fingerprint sensor based on the coordinates of the plurality of pressed center point positions, wherein the movement information includes at least one of a movement direction, a movement distance, or a movement velocity; and determining the navigation control information for navigation control on the terminal device based on the movement information.

On this basis, in the present disclosure, the movement information of the finger in the detection region of the ultrasonic fingerprint sensor is determined based on the coordinates of the plurality of pressed center point positions, thereby accurately and effectively determining the navigation control information for navigation control on the terminal device, then better achieving the finger navigation control function through the ultrasonic fingerprint sensor during underwater use of the terminal device, and improving the use effects of underwater use of the terminal device for users. It should be understood that the above optional embodiments may be understood with reference to the relevant content of the "step S206" in the embodiment of the control method in the first aspect. The difference between this and the above embodiments is that here, the control unit of the terminal device is used for processing, while in an embodiment of the first aspect, the processing unit of the ultrasonic fingerprint sensor is used for processing. The specific implementation details and principles are similar, and therefore will not be repeated here.

A specific way of determining the target operating mode of the ultrasonic fingerprint sensor is not specifically limited in the present disclosure. For example, the processing unit of the ultrasonic fingerprint sensor can receive a mode start signal from the control unit of the terminal device, to determine the target operating mode that the ultrasonic fingerprint sensor needs to enter based on the mode start signal. Then, the ultrasonic fingerprint sensor may be controlled to enter the target operating mode for operation. For example, in the navigation operating mode, after the terminal device is determined to have entered the operating mode, the control unit of the terminal device may transmit a mode start signal for switching on the navigation operating mode to the processing unit of the ultrasonic fingerprint sensor, so that the processing unit determines that the target operating mode is the navigation operating mode, and controls the ultrasonic fingerprint sensor to enter the navigation operating mode.

Alternatively, the processing unit of the ultrasonic fingerprint sensor may independently determine the target operating mode based on a preset rule. For example, it may be pre-set that the ultrasonic fingerprint sensor needs to operate in the press detection mode/fingerprint identification mode/navigation operating mode when the terminal device enters the underwater operating mode. Therefore, the target operating mode may be directly determined to be the press detection mode/fingerprint identification mode/navigation operating mode, and the ultrasonic fingerprint sensor may be controlled to enter the target operating mode for operation.

Optionally, the operating modes of the ultrasonic fingerprint sensor may further include a reset mode, which can be used for system reset of the ultrasonic fingerprint sensor, and is conducive to switching between the operating modes. In the reset mode, the ultrasonic fingerprint sensor is switched on, but neither emits nor receives ultrasonic signals (which may be simply understood that the ultrasonic fingerprint sensor is idle in this reset mode).

Optionally, the target operating mode of the ultrasonic fingerprint sensor determined in the present disclosure may be one of the above fingerprint identification operating mode, press detection operating mode, navigation operating mode, and reset mode.

Optionally, a current operating mode of the ultrasonic fingerprint sensor may be same as the target operating mode. If the current operating mode is the same as the target operating mode, the ultrasonic fingerprint sensor may be controlled to keep the current operating mode unchanged, thus achieving the purpose of controlling the ultrasonic fingerprint sensor to enter the target operating mode for operation.

Optionally, if the current operating mode of the ultrasonic fingerprint sensor is different from the target operating mode, in a process of switching the ultrasonic fingerprint sensor from the current operating mode to the target operating mode, if the target operating mode is not the reset mode, the ultrasonic fingerprint sensor may be first controlled to enter the reset mode from the current operating mode (in the reset mode, the ultrasonic fingerprint sensor is switched on, but neither emits nor receives ultrasonic signals), and then the ultrasonic fingerprint sensor may be controlled to switch from the reset mode to the target operating mode. The ultrasonic fingerprint sensor first enters the reset state, and then completes the switching of the ultrasonic fingerprint sensor to the target operating mode, thereby improving the stability and reliability of the switching. In addition, if the target operating mode is the reset mode, the ultrasonic fingerprint sensor may be directly controlled to enter the reset mode from the current operating mode.

Optionally, in other embodiments, if the current operating mode is different from the target operating mode, and neither is the reset mode, the ultrasonic fingerprint sensor may also be directly switched from the current operating mode to the target operating mode without going through the reset mode, as required.

The "determining the target operating mode of the ultrasonic fingerprint sensor" in the step S604 has been described in detail in the relevant content in an embodiment of the above first aspect, may be understood with reference to the above description, and will not be repeated here.

Optionally, in an embodiment of the control method in the third aspect, if the ultrasonic fingerprint sensor is switched off, the control unit may further control the ultrasonic fingerprint sensor to be switched on in response to determining that the terminal device has entered the underwater operating mode, so that the ultrasonic fingerprint sensor can determine the target operating mode of the ultrasonic fingerprint sensor in response to the instruction signal, and enter the target operating mode for operation.

It should be understood that in any one optional embodiment of the control method in the third aspect, the control unit of the terminal device undertakes most processing work, thereby avoiding excessive occupation of computational resources of the ultrasonic fingerprint sensor to a certain extent.

Figure 7:
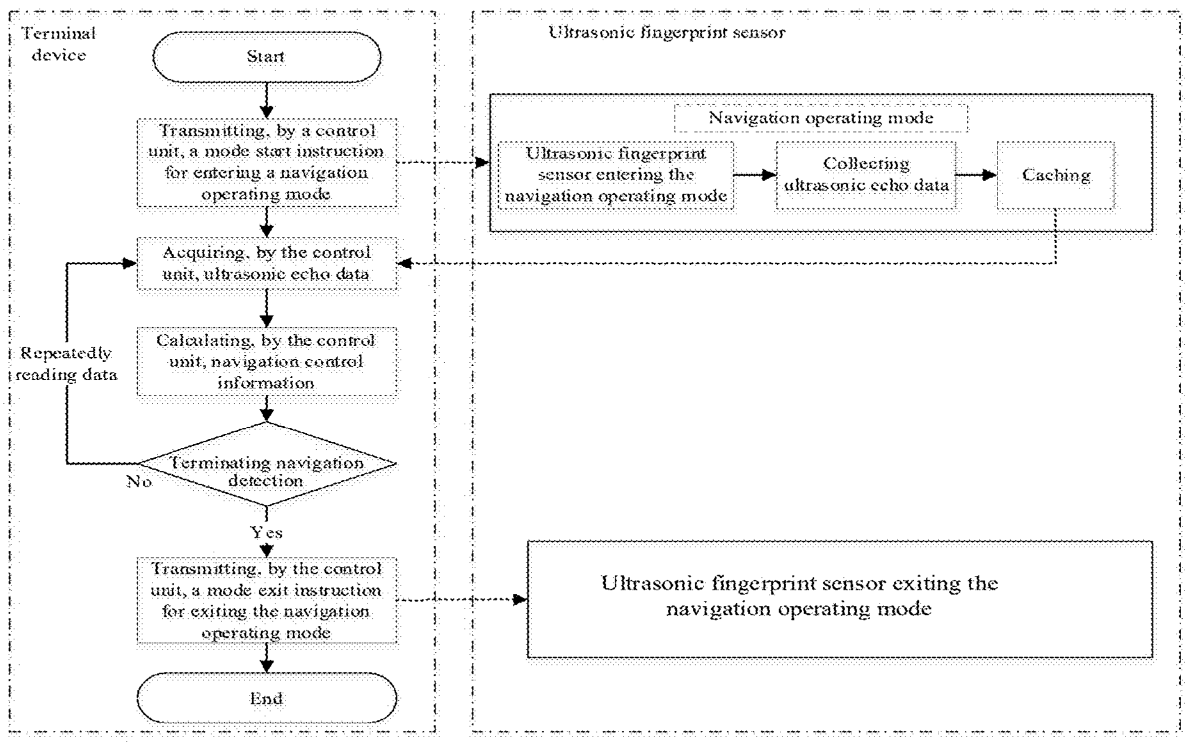
FIG. 7 is an implementation flowchart of an optional scenario where a control unit determines navigation control information when an ultrasonic fingerprint sensor is running in a navigation operating mode in an embodiment of the present disclosure.

Based on the flowchart shown in FIG. 7, an implementation process of an example scenario where a control unit determines navigation control information when an ultrasonic fingerprint sensor is running in a navigation operating mode in an embodiment of the present disclosure is shown below. As shown in FIG. 7, first, a control unit of a terminal device may transmit a mode start instruction for entering the navigation operating mode to the ultrasonic fingerprint sensor, and a processing unit of the ultrasonic fingerprint sensor may determine that a target operating mode is the navigation operating mode based on the mode start instruction and control the ultrasonic fingerprint sensor to enter the navigation operating mode; then, the ultrasonic fingerprint sensor collects an ultrasonic echo signal reflected from a finger in real time to obtain ultrasonic echo data, and caches the ultrasonic echo data; the control unit acquires the ultrasonic echo data from the ultrasonic fingerprint sensor; then, the control unit calculates the navigation control information based on the ultrasonic echo data (an optional manner may be understood with reference to the relevant content of the above embodiments, including determining coordinates of a pressed center point position, and then determining the navigation control information, which will not be repeated here); the control unit determines whether to terminate navigation detection in real time, and if navigation detection is not terminated, the control unit repeatedly reads data, and continues to acquire the ultrasonic echo data from the ultrasonic fingerprint sensor for processing, to continue to calculate the navigation control information; and if navigation detection is terminated, the control unit transmits a mode exit instruction for exiting the navigation operating mode to the ultrasonic fingerprint sensor, so that the processing unit of the ultrasonic fingerprint sensor controls the ultrasonic fingerprint sensor to exit the navigation operating mode to terminate the process. It should be understood that the above example description of FIG. 7 does not impose any limitation on the embodiments of the present disclosure.

Figure 8:
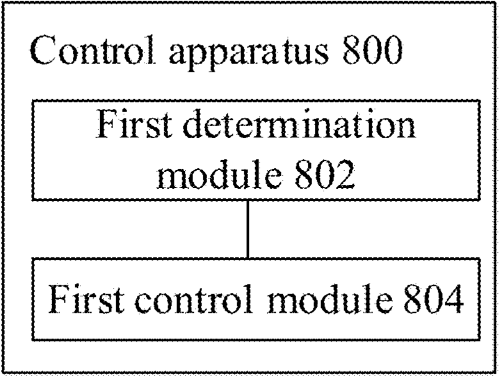
FIG. 8 is a schematic diagram of a control apparatus provided in an embodiment of a third aspect of the present disclosure.

Referring to FIG. 8, according to an embodiment in a third aspect of the present disclosure, a control apparatus 800 for an ultrasonic fingerprint sensor of a terminal device is provided. The control apparatus 800 includes:

- a first determination module 802 configured to determine whether the terminal device has entered an underwater operating mode; and
- a first control module 804 configured to determine, in response to the terminal device having entered the underwater operating mode, a target operating mode of the ultrasonic fingerprint sensor, and control the ultrasonic fingerprint sensor to enter the target operating mode for operation.

The control apparatus 1000 and optional embodiments thereof in an embodiment of the third aspect of the present disclosure have been described in detail in an embodiment of the control method in the above first aspect. Therefore, relevant content and beneficial effects thereof may be understood with reference to the content in the above optional embodiments of the method, and will not be repeated here.

Figure 9:
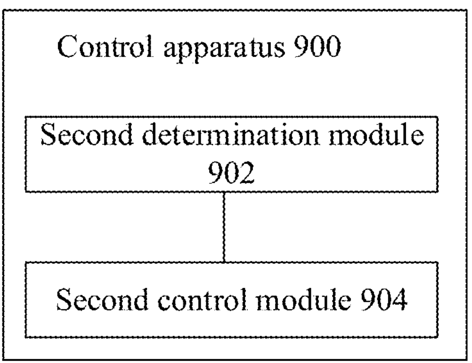
FIG. 9 is a schematic diagram of a control apparatus provided in an embodiment of a fourth aspect of the present disclosure.

Referring to FIG. 9, according to an embodiment in a fourth aspect of the present disclosure, a control apparatus 900 for a control unit of a terminal device is provided. The control apparatus 900 includes:

- a second determination module 902 configured to determine whether the terminal device has entered an underwater operating mode, and generate an indication signal in response to determining that the terminal device has entered the underwater operating mode; and
- a second control module 904 configured to transmit the indication signal to an ultrasonic fingerprint sensor, so that the ultrasonic fingerprint sensor determines a target operating mode of the ultrasonic fingerprint sensor in response to the indication signal, and enters the target operating mode for operation.

The control apparatus 900 and optional embodiments thereof in an embodiment of the fourth aspect of the present disclosure have been described in detail in the above embodiments of the control method. Therefore, relevant content and beneficial effects thereof may be understood with reference to the above optional embodiments of the method, and will not be repeated here.

According to an embodiment in a fifth aspect of the present disclosure, an electronic device is provided, including: a processor, a communication interface, a memory, and a communication bus, wherein the processor, the communication interface, and the memory complete communication with each other through the communication bus; the memory is configured to store a computer program; and the processor is configured to execute the control method in the above first aspect or second aspect by running the computer program stored on the memory.

Figure 10:
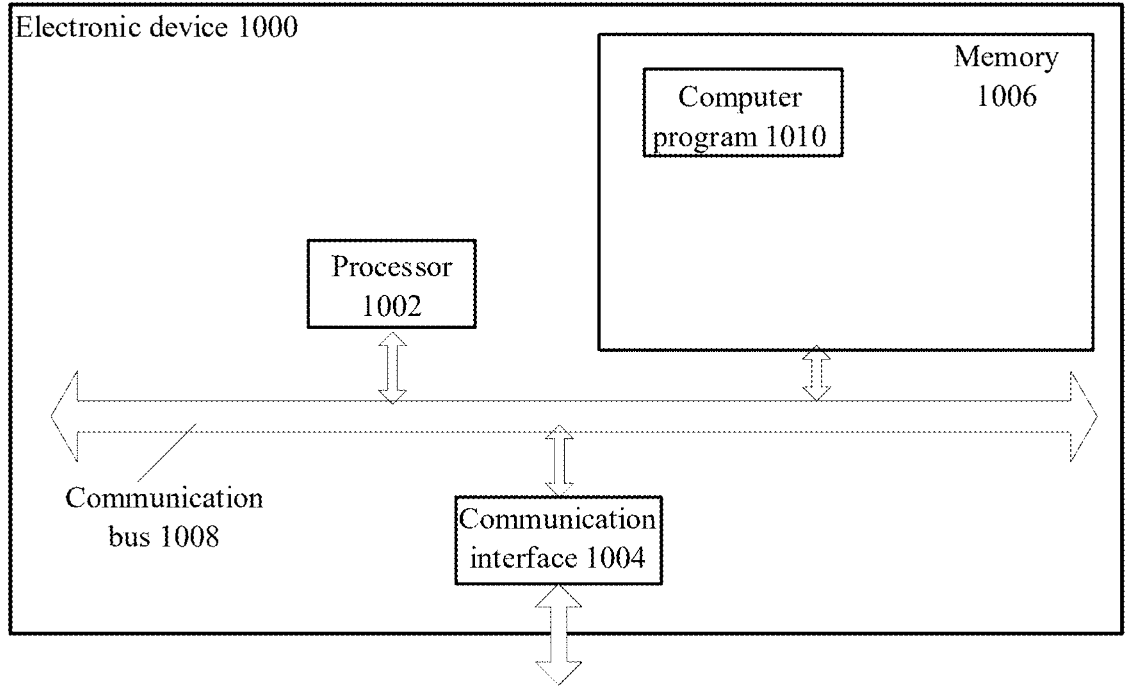
FIG. 10 is a schematic structural diagram of an electronic device provided in an embodiment of a fifth aspect of the present disclosure.

FIG. 10 shows a structural block diagram of an optional electronic device in an embodiment of the present disclosure. The embodiment of the present disclosure does not impose any limitation on specific implementations of the electronic device 1000. As an example, referring to FIG. 10, the electronic device 1000 provided in the embodiment of the present disclosure includes: a processor 1002, a communication interface 1004, a memory 1006, and a communication bus 1008, wherein:

- the processor 1002, the communication interface 1004, and the memory 1006 complete communication with each other through the communication bus 1008.

The communication interface 1004 is configured to communicate with other electronic devices or servers.

The processor 1002 is configured to execute a program 1010, and specifically may execute relevant steps in any one of the above embodiments of the control method.

Specifically, the computer program 1010 may include a program code. The program code comprises computer operation instructions.

The processor 1002 may be a CPU, or a GPU (graphics processing unit), or an ASIC (Application Specific Integrated Circuit), or one or more integrated circuits configured to implement embodiments of the present disclosure. One or more processors included in a smart device may be processors of a same type, e.g., one or more CPUs; or may be processors of different types, e.g., one or more CPUs and one or more ASICs.

The memory 1006 is configured to store the computer program 1010. The memory 1006 may include a high-speed RAM memory, and may further include a non-volatile memory, e.g., at least one disk memory.

The computer program 1010 may specifically be used for causing the processor 1002 to execute the control method in the above embodiments of the first aspect or the second aspect.

Corresponding description of the corresponding steps and units in any one of the above embodiments of the control method in the first aspect or the second aspect may be referred to for specific implementations of the steps in the computer program 1010, which will not be repeated here. Those skilled in the art can clearly understand that, for convenience and simplicity of description, the description of corresponding processes in the above method embodiments may be referred to for specific operating processes of the above-described devices and modules, which will not be repeated here.

The electronic device 1000 in an embodiment of the present disclosure has been described in detail in the above embodiments of the control method. Therefore, relevant content and beneficial effects thereof may be understood with reference to the above method embodiments, and will not be repeated here.

According to an embodiment in a fourth aspect of the present disclosure, an embodiment of the present disclosure further provides a computer storage medium, storing a computer program thereon, wherein the computer program, when executed by a processor, implements the control method described in any one embodiment among the above method embodiments in the first aspect or the second aspect. The computer storage medium includes, but is not limited to, e.g., a Compact Disc Read-Only Memory (CD-ROM), a Random Access Memory (RAM), a floppy disk, a hard disk, or a magneto-optical disk.

According to an embodiment in a fifth aspect of the present disclosure, an embodiment of the present disclosure further provides a computer program product, including a computer program, wherein the computer program, when executed by a processor, implements the control method described in any one embodiment among the above embodiments in the first aspect or the second aspect.

The embodiments of the control apparatus 800/control apparatus 900/electronic device 1000/computer storage medium/computer program product among the embodiments of the present disclosure have been described in detail in the above embodiments of the control method. Therefore, relevant content and beneficial effects thereof may be understood with reference to the above method embodiments, and will not be repeated here.

It should be understood that the figures of this embodiment are provided to show structures, and dimensional proportions of the structures are not necessarily drawn to the actual scale.

In addition, it should be noted that user-related information (including but not limited to user device information, user personal information, etc.) and data (including but not limited to sample data for model training, data for analysis, stored data, displayed data, etc.) involved in the embodiments of the present disclosure are all information and data that are authorized by a user or fully authorized by all parties. Relevant data needs to be collected, used, and processed following relevant laws, regulations, and standards of relevant countries and regions, and be proved with a corresponding operation portal for users to choose or refuse authorization.

It should be noted that, depending on the implementation requirements, the components/steps described in this embodiment may be split into more components/steps, or two or more components/steps or partial operations of the components/steps may be combined into novel components/steps to achieve the goal of the embodiments of the present disclosure.

The above method according to the embodiments of the present disclosure may be implemented in hardware or firmware, or be implemented as software or a computer code storable in a recording medium (such as a CD-ROM, a RAM, a floppy disk, a hard disk, or a magneto-optical disk), or be implemented as a computer code that is downloaded from a network, is originally stored in a remote recording medium or a non-transitory machine-readable medium, and will be stored in a local recording medium, such that the method described herein may be processed by such software stored on a recording medium using a general-purpose computer, a special-purpose processor, or programmable or dedicated hardware (such as an Application Specific Integrated Circuit (ASIC) or a Field Programmable Gate Array (FPGA)). It is understandable that a computer, a processor, a microprocessor controller, or programmable hardware includes a storage component (e.g., a Random Access Memory (RAM), a Read-Only Memory (ROM), or a flash memory) that can store or receive software or a computer code. The method described herein is implemented when the software or the computer code is accessed and executed by the computer, the processor, or the hardware. Further, when a general-purpose computer accesses the code for implementing the method shown herein, the execution of the code converts the general-purpose computer to a special-purpose computer configured to execute the method shown herein.

As will be appreciated by those of ordinary skills in the art, the various example units and method steps described in combination with the embodiments disclosed herein can be implemented by electronic hardware, or a combination of computer software and electronic hardware. Whether these functions are executed by hardware or software depends on particular applications and design constraints of the technical solutions. Those skilled in the art may implement the described functions for particular applications using different methods, but such implementation should not be considered as falling beyond the scope of the embodiments of the present disclosure.

The above embodiments are only used to illustrate the embodiments of the present disclosure, and are not intended to limit the embodiments of the present disclosure. Those of ordinary skills in the relevant technical field may further make various alterations and modifications without departing from the spirit and scope of the embodiments of the present disclosure. Therefore, all equivalent technical solutions are also encompassed within the scope of the embodiments of the present disclosure, and the scope of patent protection of the embodiments of the present disclosure should be defined by the appended claims.

The invention claimed is:

1. A control method, applied to an ultrasonic fingerprint sensor of a terminal device, comprising:

determining whether the terminal device has entered an underwater operating mode; and determining, in response to the terminal device having entered the underwater operating mode, a target operating mode of the ultrasonic fingerprint sensor, and controlling the ultrasonic fingerprint sensor to enter the target operating mode for operation;

wherein the target operating mode of the ultrasonic fingerprint sensor comprises a navigation operating mode, and the control method further comprises: controlling, when the ultrasonic fingerprint sensor operates in the navigation operating mode, the ultrasonic fingerprint sensor to collect ultrasonic echo data from a finger, and determining navigation control information for navigation control on the terminal device based on the ultrasonic echo data, the determining the navigation control information for navigation control on the terminal device based on the ultrasonic echo data comprises:

acquiring a plurality of ultrasonic echo data collected by the ultrasonic fingerprint sensor from the finger respectively at a plurality of different moments;

determining a plurality of press position information of the finger on a detection region of the ultrasonic fingerprint sensor at the plurality of different moments based on the plurality of ultrasonic echo data; and determining the navigation control information for navigation control on the terminal device based on the obtained press position information, wherein the ultrasonic fingerprint sensor comprises a plurality of ultrasonic subunits, each of the ultrasonic subunits is configured to collect ultrasonic echo subdata from the finger, and the ultrasonic echo data at any moment comprises a plurality of ultrasonic echo subdata collected by the plurality of ultrasonic subunits at that moment, the determining the plurality of press position information of the finger on the detection region of the ultrasonic fingerprint sensor at the plurality of different moments based on the plurality of ultrasonic echo data comprises:

determining, for each ultrasonic echo data among the plurality of ultrasonic echo data, echo strength distribution information corresponding to a moment at which the ultrasonic echo data is collected based on an ultrasonic echo signal strength indicated by the plurality of ultrasonic echo subdata of the ultrasonic echo data, and determining coordinates of a pressed center point position corresponding to the moment at which the ultrasonic echo data is collected based on the echo strength distribution information, wherein the echo strength distribution information is used to indicate strength distribution of ultrasonic echo signals received by the ultrasonic subunits at different positions; and determining the obtained coordinates of a plurality of pressed center point positions as the information of the plurality of pressed positions.

2. The method according to claim 1, wherein the determining whether the terminal device has entered the underwater operating mode comprises:

acquiring sensing data detected by a sensor of the terminal device, and determining whether the terminal device has entered the underwater operating mode based on the sensing data;

or acquiring a first indication signal transmitted from a control unit of the terminal device, and determining that the terminal device has entered the underwater operating mode based on the first indication signal, wherein the first indication signal is determined by the control unit based on the sensing data detected by the sensor of the terminal device.

3. The method according to claim 2, wherein the sensing data comprises touch sensing data detected by a touch sensor of the terminal device, wherein the touch sensing data comprises at least one of capacitance data or touch area data detected by the touch sensor, and the touch area data is used to indicate a pressed area within a detection region of the touch sensor when the terminal device is touched through the touch sensor; and the determining whether the terminal device has entered the underwater operating mode based on the sensing data comprises:

determining that the terminal device has entered the underwater operating mode, in response to a variation amount of the capacitance data within first preset time satisfying a first preset condition, and/or the touch area data indicating that the pressed area reaches a second preset condition.

4. The method according to claim 2, wherein the sensing data comprises ultrasonic echo data collected by the ultrasonic fingerprint sensor; and the determining whether the terminal device has entered the underwater operating mode based on the sensing data comprises:

determining that the terminal device has entered the underwater operating mode, in response to a variation amount of the ultrasonic echo data within second preset time satisfying a third preset condition, and/or acoustic impedance data determined based on the ultrasonic echo data satisfying a fourth preset condition.

5. The method according to claim 1, wherein the determining whether the terminal device has entered the underwater operating mode comprises:

determining that the terminal device has entered the underwater operating mode, in response to the terminal device having been set by a user to the underwater operating mode.

6. The method according to claim 1, wherein operating modes of the ultrasonic fingerprint sensor comprise: at least one of a fingerprint identification operating mode and a press detection operating mode; and the method further comprises:

controlling, when the ultrasonic fingerprint sensor operates in the fingerprint identification operating mode, the ultrasonic fingerprint sensor to collect ultrasonic echo data from the finger, and performing fingerprint identification based on the ultrasonic echo data; and/or controlling, when the ultrasonic fingerprint sensor operates in the press detection operating mode, the ultrasonic fingerprint sensor to collect ultrasonic echo data from the finger, and performing press detection based on the ultrasonic echo data.

7. The method according to claim 1, wherein the echo strength distribution information is an echo strength distribution diagram in an image form, the echo strength distribution diagram comprises a plurality of image regions with one-to-one correspondence to the plurality of ultrasonic subunits, and a positional arrangement relationship between the plurality of image regions is determined based on a positional arrangement relationship between the plurality of ultrasonic subunits; and the determining the echo strength distribution information corresponding to the moment at which the ultrasonic echo data is collected based on the ultrasonic echo signal strength indicated by the plurality of ultrasonic echo subdata of the ultrasonic echo data comprises:

acquiring, for each ultrasonic echo subdata of the ultrasonic echo data, a to-be-processed echo strength distribution diagram, and assigning an image feature value to an image region corresponding to a target ultrasonic subunit in the to-be-processed echo strength distribution diagram based on the ultrasonic echo signal strength indicated by the ultrasonic echo subdata, to obtain an echo strength distribution diagram corresponding to the moment at which the ultrasonic echo data is collected after each image region of the to-be-processed echo strength distribution diagram is assigned with an image feature value;

wherein the target ultrasonic subunit is an ultrasonic subunit collecting the ultrasonic echo subdata, and the to-be-processed echo strength distribution diagram is a blank echo strength distribution diagram or a historical echo strength distribution diagram.

8. The method according to claim 7, wherein the determining the coordinates of the pressed center point position corresponding to the moment at which the ultrasonic echo data is collected based on the echo strength distribution information comprises:

determining the coordinates of the pressed center point position corresponding to the moment at which the ultrasonic echo data is collected based on coordinates of an image region with a largest or smallest image feature value in the echo strength distribution diagram in a preset image coordinate system.

9. The method according to claim 1, wherein the determining the navigation control information for navigation control on the terminal device based on the obtained press position information comprises:

determining movement information of the finger on the detection region of the ultrasonic fingerprint sensor based on the coordinates of the plurality of pressed center point positions, wherein the movement information comprises at least one of a movement direction, a movement distance, or a movement velocity; and determining the navigation control information for navigation control on the terminal device based on the movement information.

10. The method according to claim 1, wherein the ultrasonic fingerprint sensor comprises at least one of a side ultrasonic fingerprint sensor, a rear ultrasonic fingerprint sensor, and an under-display ultrasonic fingerprint sensor.

11. A control method, applied to a control unit of a terminal device, comprising:

determining whether the terminal device has entered an underwater operating mode, and generating an indication signal in response to determining that the terminal device has entered the underwater operating mode; and transmitting the indication signal to an ultrasonic fingerprint sensor, so that the ultrasonic fingerprint sensor determines a target operating mode of the ultrasonic fingerprint sensor in response to the indication signal, and enters the target operating mode for operation, wherein the target operating mode of the ultrasonic fingerprint sensor comprises a navigation operating mode, and the control method further comprises: acquiring, when the ultrasonic fingerprint sensor operates in the navigation operating mode, ultrasonic echo data collected by the ultrasonic fingerprint sensor from a finger, and determining navigation control information for navigation control on the terminal device based on the ultrasonic echo data, the determining the navigation control information for navigation control on the terminal device based on the ultrasonic echo data comprises:

acquiring a plurality of ultrasonic echo data collected by the ultrasonic fingerprint sensor from the finger respectively at a plurality of different moments;

determining press position information of the finger on a detection region of the ultrasonic fingerprint sensor at the plurality of different moments based on the plurality of ultrasonic echo data; and determining the navigation control information for navigation control on the terminal device based on the obtained press position information, and wherein the ultrasonic fingerprint sensor comprises a plurality of ultrasonic subunits, each of the ultrasonic subunits is configured to collect ultrasonic echo subdata from the finger, and the ultrasonic echo data at any moment comprises a plurality of ultrasonic echo subdata collected by the plurality of ultrasonic subunits at that moment;

the determining the plurality of press position information of the finger on the detection region of the ultrasonic fingerprint sensor at the plurality of different moments based on the plurality of ultrasonic echo data comprises:

determining, for each ultrasonic echo data among the plurality of ultrasonic echo data, echo strength distribution information corresponding to a moment at which the ultrasonic echo data is collected based on an ultrasonic echo signal strength indicated by the plurality of ultrasonic echo subdata of the ultrasonic echo data, and determining coordinates of a pressed center point position corresponding to the moment at which the ultrasonic echo data is collected based on the echo strength distribution information, wherein the echo strength distribution information is used to indicate strength distribution of ultrasonic echo signals received by the ultrasonic subunits at different positions; and determining the obtained coordinates of a plurality of pressed center point positions as the information of the plurality of pressed positions.

12. The method according to claim 11, wherein the indication signal comprises a first indication signal; and the determining whether the terminal device has entered the underwater operating mode, and generating the indication signal in response to determining that the terminal device has entered the underwater operating mode comprises:

acquiring sensing data detected by a sensor of the terminal device, determining whether the terminal device has entered the underwater operating mode based on the sensing data, and generating the first indication signal in response to determining that the terminal device has entered the underwater operating mode.

13. The method according to claim 12, wherein the sensing data comprises touch sensing data detected by a touch sensor of the terminal device, wherein the touch sensing data comprises at least one of capacitance data or touch area data detected by the touch sensor, and the touch area data is used to indicate a pressed area within a detection region of the touch sensor when the terminal device is touched through the touch sensor; and the determining whether the terminal device has entered the underwater operating mode based on the sensing data comprises:

determining that the terminal device has entered the underwater operating mode, in response to a variation amount of the capacitance data within first preset time satisfying a first preset condition, and/or the touch area data indicating that the pressed area reaches a second preset condition.

14. The method according to claim 12, wherein the sensing data comprises ultrasonic echo data collected by the ultrasonic fingerprint sensor; and the determining whether the terminal device has entered the underwater operating mode based on the sensing data comprises:

determining that the terminal device has entered the underwater operating mode, in response to a variation amount of the ultrasonic echo data within second preset time satisfying a third preset condition, and/or acoustic impedance data determined based on the ultrasonic echo data satisfying a fourth preset condition.

15. The method according to claim 11, wherein the indication signal comprises a second indication signal; and the determining whether the terminal device has entered the underwater operating mode, and generating the indication signal in response to determining that the terminal device has entered the underwater operating mode comprises:

determining whether the terminal device has been set by a user to the underwater operating mode, determining that the terminal device has entered the underwater operating mode in response to determining that the terminal device has been set by the user to the underwater operating mode, and generating a second indication signal.

16. The method according to claim 11, wherein operating modes of the ultrasonic fingerprint sensor comprise: at least one of a fingerprint identification operating mode and a press detection operating mode; and the method further comprises:

acquiring, when the ultrasonic fingerprint sensor operates in the fingerprint identification operating mode, ultrasonic echo data collected by the ultrasonic fingerprint sensor from the finger, and performing fingerprint identification based on the ultrasonic echo data; and/or acquiring, when the ultrasonic fingerprint sensor operates in the press detection operating mode, ultrasonic echo data collected by the ultrasonic fingerprint sensor from the finger, and performing press detection based on the ultrasonic echo data.

17. An electronic device, comprising: a processor, a communication interface, a memory, and a communication bus, wherein the processor, the communication interface, and the memory complete communication with each other through the communication bus;

the memory is configured to store a computer program; and the processor is configured to execute the method according to claim 1 by running the computer program stored on the memory.

* * * * *